United States Patent
Handa et al.

(10) Patent No.: US 6,180,254 B1
(45) Date of Patent: Jan. 30, 2001

(54) BIAXIALLY ORIENTED FILM AND MAGNETIC RECORDING MEDIUM COMPRISING THE SAME AS A BASE FILM

(75) Inventors: Makoto Handa; Mitsumasa Ono; Takeo Asai; Hiroshi Tomita; Kenji Suzuki, all of Sagamihara (JP)

(73) Assignee: Teijin Limited, Osaka (JP)

( * ) Notice: Under 35 U.S.C. 154(b), the term of this patent shall be extended for 0 days.

(21) Appl. No.: 09/179,428

(22) Filed: Oct. 27, 1998

(30) Foreign Application Priority Data

| Oct. 27, 1997 | (JP) | 9-294064 |
| Dec. 12, 1997 | (JP) | 9-343047 |
| Dec. 12, 1997 | (JP) | 9-343048 |
| Mar. 18, 1998 | (JP) | 10-068615 |
| Mar. 18, 1998 | (JP) | 10-068616 |

(51) Int. Cl.$^7$ ............................................. G11B 5/66
(52) U.S. Cl. ........................ 428/474.4; 428/694 ST; 428/694 SL; 428/694 SG; 428/900; 528/183; 528/348
(58) Field of Search .................... 428/474.4, 694 ST, 428/694 SL, 694 SG, 900; 528/183, 348

(56) References Cited

U.S. PATENT DOCUMENTS

| 3,991,037 | * 11/1976 | Eckardt | 528/348 |
| 4,075,172 | 2/1978 | Ozawa et al. | 528/183 |

FOREIGN PATENT DOCUMENTS

| 0 621 304 A1 | 10/1994 | (EP) . |
| 51-129201 | 11/1976 | (JP) . |
| 52-39719 | 10/1977 | (JP) . |
| 58-154756 | 9/1983 | (JP) . |
| 61-123631 | 6/1986 | (JP) . |
| 61-246919 | 11/1986 | (JP) . |
| 8203064 | * 9/1996 | (JP) . |

OTHER PUBLICATIONS

Kashiwagi, Akira, et al., "High Density Magnetic Recording by Means of Thin Layer Particulate Media On a Research of Atom for High Density Recording," Feb. 1995, pp. 35–40.

* cited by examiner

*Primary Examiner*—Leszek Kiliman
(74) *Attorney, Agent, or Firm*—Sughrue, Mion, Zinn, Macpeak & Seas, PLLC

(57) ABSTRACT

A biaxially oriented film made from a wholly aromatic polyamide produced by an acid chloride process, which contains at least one member of inorganic particles having an average particle diameter of 5 to 2,000 nm and selected from the group consisting of hydroxides, carbonates and bicarbonates of metals of groups Ia and IIa of the periodic table. The inorganic particles is derived from inorganic particles which are added as a neutralizing agent to a reaction system to neutralize hydrogen chloride by-produced by the acid chloride reaction and its content corresponds to an excess portion added to the reaction system over the amount required for neutralizing the hydrogen chloride stoichiometrically. The film is useful as a base film for a magnetic recording medium, such as a coated, a multi-layer coated, or a thin metal film high-density magnetic recording medium.

Figure 1:
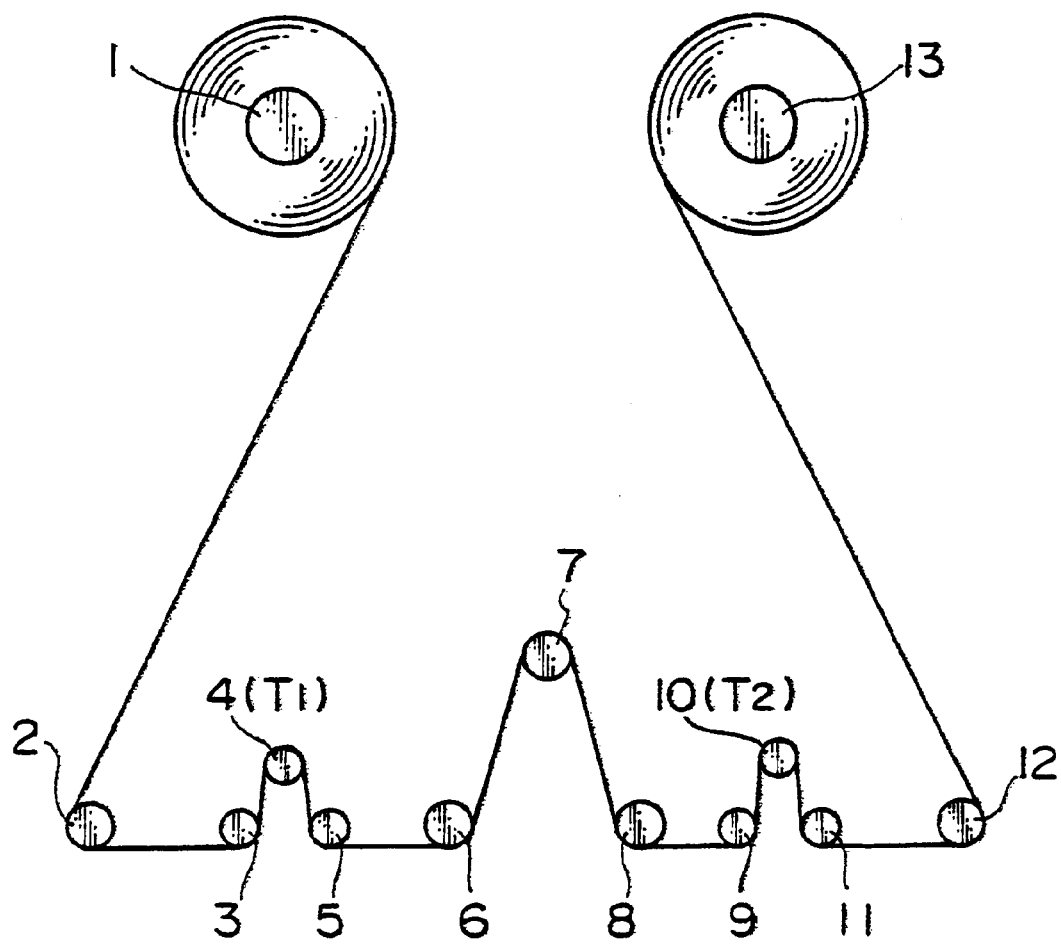

24 Claims, 1 Drawing Sheet

BIAXIALLY ORIENTED FILM AND MAGNETIC RECORDING MEDIUM COMPRISING THE SAME AS A BASE FILM

DETAILED DESCRIPTION OF THE INVENTION

The present invention relates to a biaxially oriented film made from a wholly aromatic polyamide and to a magnetic recording medium comprising the same as a base film. More specifically, it relates to a biaxially oriented film made from a wholly aromatic polyamide, which is excellent in handling properties such as strength, slipperiness and winding property and has excellent abrasion resistance, and to a magnetic recording medium comprising the same as a base film.

In recent years, remarkable progress has been made in high-density magnetic recording, as exemplified by the development and practical implementation of a thin layer coated magnetic recording medium in which a needle-like magnetic powder material such as metal powders or iron oxide powders is coated on a coated magnetic recording medium to a thickness of 2 µm or less. For example, an extremely thin layer coated magnetic recording medium for high-density magnetic recording is known (refer to technical report MR 94-78 issued by the Institute of Electronics, Information and Communication Engineers (1995-02)).

Since a coated magnetic recording medium of the prior art (a magnetic recording medium in which a mixture of magnetic powders and an organic polymer binder is coated on a non-magnetic base film) has a low recording density and a long recording wavelength, it has a large thickness of about 2 µm or more. On the other hand, in the case of an extremely thin layer coated magnetic recording medium, there is proposed a magnetic layer as extremely thin as 0.13 µm, though it has a non-magnetic under-layer.

Along with a reduction in the size of a recording medium itself, it is desired to reduce the thickness of a base film itself in order to increase recording capacity.

An aromatic polyamide film is a material which is excellent in strength, heat resistance and the like due to high Young's moduli as a thin film and suitable for use in a high-density magnetic recording medium.

JP-A 51-129201 (the term "JP-A" as used herein means an "unexamined published Japanese patent application") discloses a magnetic recording medium which comprises a magnetic layer and an aromatic polyamide film in which 70% or more of all the bonds are para bonds and at least 15% of phenyl nuclei have at least one substituent of halogen and nitro groups at the ortho-positions of an amide bond.

In the high-density magnetic recording medium, the surface condition of a non-magnetic base film greatly influences the surface properties of a magnetic layer, and surface irregularities cause noise in recording and reproduction signals. Therefore, it is desirable that the surface of the non-magnetic base film be as smooth as possible.

On the other hand, from a viewpoint of the formation of a non-magnetic base film and handling properties such as transportation, damaging, wind-up and wind-off in the process of film formation, when the surface of the film is too smooth, slipperiness between films deteriorates, a blocking phenomenon occurs, roll formation becomes difficult, and the yield of products lowers, thereby inducing an increase in production costs. Therefore, from a viewpoint of production costs, it is desirable that the surface of the non-magnetic base film be as rough as possible.

As means for satisfying the above antinomic requirements, there is proposed a method for forming protrusions which are appropriate in terms of height and density and derived from particles having optimal particle diameters on the surface of the base film.

As a method for forming protrusions on the surface of an aromatic polyamide film, there have been proposed a) one in which a predetermined amount of inorganic particles are added and b) one in which organic polymer particles or inorganic particles whose surface is treated with an organic polymer are added.

JP-A 61-246919 discloses a film which is essentially composed of an aromatic polyamide or aromatic polyimide containing 0.01 to 10 wt % of inorganic particles as a film produced by a method a). The film has protrusions derived from the inorganic particles and specified as follows. The heights $R_m$ of fine protrusions range from 30 to 500 Å, the area average diameter $D_A$ of the fine protrusions ranges from 0.01 µm or more to less than 0.3 µm, the average flatness $D_A/R_m$ of the protrusions is 15 or less, the number $N_A$ of fine protrusions having a maximum diameter of 0.01 µm or more is $10^4$ to $10^9/mm^2$, the number of fine protrusions having a long diameter/short diameter ratio a/b (a: maximum diameter of fine protrusion, b: diameter intersecting the maximum diameter at a right angle) of 2 or more is $0.2 \times N_A$ or less, and the number of fine protrusions having a circularity $\pi D_N/C_N$ ($D_N$: area diameter of fine protrusion, $C_N$: circumference of fine protrusion, π: ratio of the circumference of a circle to its diameter) of 0.7 or less is $0.2 \times N_A$ or less.

JP-A 8-203064 discloses a film made from an aromatic polyamide or an aromatic polyimide, which contains organic polymer particles having an average particle diameter of 10 to 500 nm or inorganic particles surface-treated with an organic polymer, has a center line surface roughness Ra of one surface of 0.5 to 50 nm and an Ra of the other surface of 10 nm or less.

However, the above methods using externally added particles involve such a defect that the particles fall off from the protrusion on the film surface by friction between the guide pin and the surface of the film in the calendering step after the coating of a magnetic layer or during actual use and contaminate the step because the externally added particles easily agglomerate in the added slurry.

Particularly, in the calendering step after the application of a magnetic coating, extremely high shearing force is applied to the base film. Therefore, large voids formed around the agglomeration of the particles produce a great amount of abrasion dust due to the fall-off of the particles, thereby contaminating the calender roll with the result of a great reduction in productivity.

It is an object of the present invention to provide a novel biaxially oriented wholly aromatic polyamide film.

It is another object of the present invention to provide a biaxially oriented wholly aromatic polyamide film for a magnetic recording medium, which is excellent in handling properties such as strength, slipperiness and winding property and has high abrasion resistance.

It is still another object of the present invention to provide a magnetic recording medium which comprises the biaxially oriented wholly aromatic polyamide film of the present invention as a base film, has excellent electromagnetic conversion characteristics and is suitable for high-density recording.

Other objects and advantages of the present invention will become apparent from the following description.

According to the present invention, firstly, the above objects and advantages of the present invention can be attained by a biaxially oriented film made from a wholly aromatic polyamide produced by an acid chloride process, which contains at least one member of inorganic particles having an average particle diameter of 5 to 2,000 nm and selected from the group consisting of hydroxides, carbonates and bicarbonates of metals of groups Ia and IIa of the periodic table, the inorganic particles being derived from inorganic particles which are added as a neutralizing agent to a reaction system to neutralize hydrogen chloride by-produced by the acid chloride reaction and its content corresponding to an excess portion added to the reaction system over the amount required for neutralizing the hydrogen chloride stoichiometrically.

The wholly aromatic polyamide constituting the biaxially oriented film of the present invention is not particularly limited as far as its main chain comprises an aromatic nucleus and an amide bonding group as main constituents.

Preferred examples of the recurring unit forming the wholly aromatic polyamide of the present invention include units represented by the following formulas (1) to (4):

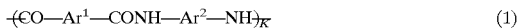  (1)

wherein $Ar^1$ and $Ar^2$ are independently selected from the group consisting of

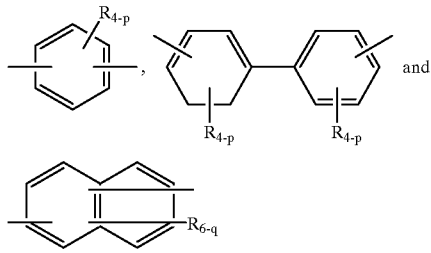

(in which p is an integer of 0 to 4, q is an integer of 0 to 6, R is selected from the group consisting of halogen, nitro group, cyano group, alkyl group having 1 to 4 carbon atoms, alkoxyl group having 1 to 3 carbon atoms and trialkylsilyl group) and k is 0 or a positive number,

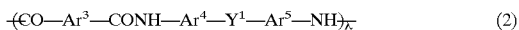  (2)

wherein $Ar^3$, $Ar^4$ and $Ar^5$ are independently selected from the same groups as those of $Ar^1$ and $Ar^2$, $Y^1$ is selected from the group consisting of —O—, —CH$_2$—, —C(CH$_3$)$_2$—, —SO$_2$—, —S— and —CO—, and l is 0 or a positive number,

  (3)

wherein $Ar^6$ is selected from the same groups as those of $Ar^1$ and $Ar^2$, and m is 0 or a positive number, and

  (4)

wherein $Ar^7$ and $Ar^8$ are independently selected from the same groups as those of $Ar^1$ and $Ar^2$, $Y^2$ is selected from the same groups as those of $Y^1$, and n is 0 or a positive number.

It is preferred that the wholly aromatic polyamide in the present invention preferably contains at least one of the recurring units (1) and (2). That is, the wholly aromatic polyamide consists of (i) only the recurring units of the above formula (1), (ii) only the recurring units of the above formula (2) or (iii) only the recurring units of the above formulas (1) and (2). Further, a wholly aromatic polyamide consisting of (iv) at least one of the recurring units of the above formulas (1) and (2) and at least one of the recurring units of the above formulas (3) and (4) is preferred.

The wholly aromatic polyamide in the present invention is produced by an acid chloride process.

In the above formula (1), $Ar^1$ and $Ar^2$ are a residual group obtained by removing an acid chloride group from an aromatic dicarboxylic acid chloride and a residual group obtained by removing an amino group from an aromatic diamine, respectively.

$Ar^1$ and $Ar^2$ are independently a residual divalent aromatic group selected from the group consisting of

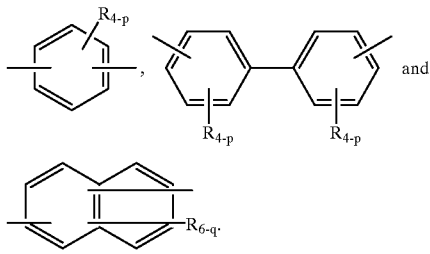

In the above formulas, R is halogen, nitro group, cyano group, alkyl group having 1 to 4 carbon atoms, alkoxyl group having 1 to 3 carbon atoms or trialkylsilyl group. p is an integer of 0 to 4 and q is an integer of 0 to 6.

Illustrative examples of the above residual divalent aromatic group include 1,4-phenylene group, 1,3-phenylene group, 1,2-phenylene group, 4,4'-biphenylene group, 4,3'-biphenylene group, 4,2'-biphenylene group, 3,3'-biphenylene group, 3,2'-biphenylene group, 2,2'-biphenylene group, 1,4-naphthylene group, 1,5-naphthylene group, 1,6-naphthylene group, 2,6-naphthylene group, 2,7-naphthylene group and groups obtained by replacing these groups by the above substituents. Of these, 1,4-phenylene group, 4,4'-biphenylene group, 1,4-naphthylene group, 2,6-naphthylene group and groups obtained by replacing these groups by the above substituents are preferred.

Preferred examples of the halogen represented by the substituent R include fluorine, chlorine and bromine. The alkyl group having 1 to 4 carbon atoms may be straight-chain or branched-chain and preferred examples thereof include methyl group, ethyl group, n-propyl group, isopropyl group, n-butyl group, isobutyl group, t-butyl group and the like. The alkoxyl group having 1 to 3 carbon atoms may be straight-chain or branched-chain, as exemplified by methoxy group, ethoxy group, n-propoxy group and isopropoxy group. Further, the trialkylsilyl group is preferably a trialkylsilyl group each alkyl group of which independently has 1 to 3 carbon atoms, such as trimethylsilyl group.

Illustrative examples of the recurring unit represented by the above formula (1) are obvious from the above specific examples of $Ar^1$ and $Ar^2$. For example, when $Ar^1$ and $Ar^2$ are both a 1,4-phenylene group, the recurring unit is represented by the following formula:

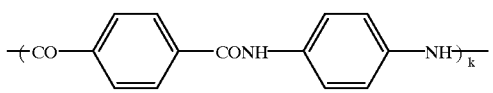

wherein k is the same as defined in the above formula (1).

In the above formula (2), $Ar^3$, $Ar^4$ and $Ar^5$ are independently selected from the same groups as those of $Ar^1$ and $Ar^2$. $Y^1$ is —O—, —CH$_2$—, —C(CH$_3$)$_2$—, —SO$_2$—, —S— or —CO—.

Illustrative examples of the recurring unit represented by the above formula (2) are obvious from specific examples of $Ar^1$, $Ar^2$ and $Y^1$. For example, when $Ar^3$, $Ar^4$ and $Ar^5$ are all a 1,4-phenylene group and $y^1$ is —O—, the recurring unit is represented by the following formula:

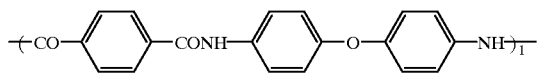

wherein l is the same as defined in the above formula (2).

In the above formula (3), $Ar^6$ is selected from the same groups as those of $Ar^1$ and $Ar^2$.

Illustrative examples of the recurring unit represented by the above formula (3) are obvious from specific examples of $Ar^1$ and $Ar^2$. For example, when $Ar^6$ is a 1,4-phenylene group, the recurring unit is represented by the following formula:

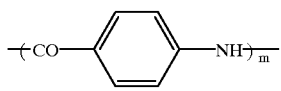

wherein m is the same as defined in the above formula (3).

In the above formula (4), $Ar^7$ and $Ar^8$ are independently selected from the same groups as those of $Ar^1$ and $Ar^2$, and $Y^2$ is selected from the same groups as those of $Y^1$.

Illustrative examples of the recurring unit represented by the above formula (4) are obvious from specific examples of $Ar^1$, $Ar^2$ and $Y^1$. For example, when $Ar^7$ and $Ar^8$ are both a 1,4-phenylene group and $Y^2$ is —O—, the recurring unit is represented by the following formula:

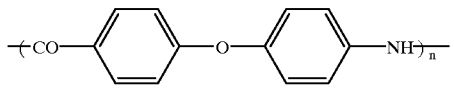

wherein n is the same as defined in the above formula (4).

The wholly aromatic polyamide in the present invention preferably consists of at least one member of recurring units selected from the group consisting of recurring units represented by the above formulas (1) to (4), and 50 to 99.5% of at least one member of aromatic groups selected from the group consisting of $Ar^1$ to $Ar^8$ existent in at least one member of the selected recurring units has a para-orientation and forming a main chain. In this case, the wholly aromatic polyamide contains at least one of the recurring units represented by the above formulas (1) and (2).

In the present invention, the aromatic group having para-orientation refers to, for example, 1,4-phenylene group, 4,4'-biphenylene group, 1,4-naphthylene group or 2,6-naphthylene group.

From the viewpoint of the recurring units, the wholly aromatic polyamide in the present invention preferably consists of recurring units represented by the above formulas (1) and (2), particularly preferably recurring units represented by the above formula (1) in which $Ar^1$ and $Ar^2$ are both a 1,4-phenylene group and recurring units represented by the above formula (2) in which $Ar^3$ is 1,4-phenylene group, and $Ar^4$ is 1,4-phenylene group, $Y^1$ is —O— and $Ar^5$ is 1,3-phenylene group, and the recurring unit is represented by the following formula:

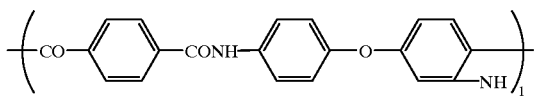

The biaxially oriented film of the present invention comprises the above wholly aromatic polyamide as a base and contains inorganic particles having an average particle diameter of 5 to 2,000 nm. The inorganic particles are selected from the group consisting of hydroxides, carbonates and bicarbonates of metals of groups I and II of the periodic table. Illustrative examples of the inorganic particles include magnesium hydroxide, magnesium carbonate, calcium hydroxide, calcium carbonate, barium hydroxide, barium carbonate, calcium bicarbonate and the like. Of these, magnesium hydroxide, magnesium carbonate, calcium hydroxide and calcium carbonate are preferred.

The inorganic particles are derived from the hydroxide, carbonate or bicarbonate of a metal of group I or II of the periodic table, which is added to a reaction system to neutralize hydrogen chloride by-produced in an acid chloride reaction for producing the wholly aromatic polyamide, that is, a reaction between an aromatic dicarboxylic acid chloride and an aromatic diamine. In other words, by adding the inorganic particles to the reaction system in an amount exceeding the stoichiometric amount of the inorganic particles required for neutralizing the by-produced hydrogen chloride, the inorganic particles are caused to remain in the reaction system in an amount corresponding to the excess portion over the stoichiometric amount. Paying attention to each of the inorganic particles added to make the present invention more comprehensible, a relatively small particle may be completely consumed by a neutralization reaction and lost, whereas a surface portion of a relatively large particle is consumed by the neutralization reaction but a core portion of the particle may still remain at the termination of the neutralization reaction. In view of this, to make the inorganic particles having an average particle diameter of 5 to 2,000 nm existent in the film, the average particle diameter of the inorganic particles to be added to the reaction system is preferably in the range of 150 to 20,000 nm, more preferably 150 to 15,000 nm.

As described above, the inorganic particles contained in the biaxially oriented film of the present invention are obtained as the residual particles of the neutralizing agent in the polymerization step of the wholly aromatic polyamide. Since they are fully dispersed in the system in the polymerization step, there is no possibility of the agglomeration of the particles which can be the cause of abrading. When the average particle diameter of the particles contained in the film is smaller than 5 nm, their effect of forming protrusions on the surface is small and excellent handling properties such as slipperiness and winding property are not obtained disadvantageously. When the average particle diameter is large than 2,000 nm, voids formed by stretching the film become too large, thereby deteriorating abrasion resistance disadvantageously. The average particle diameter of the inorganic particles contained in the film is preferably 80 to 1,000 nm, more preferably 90 to 800 nm, particularly preferably 100 to 500 nm.

The average particle diameter of the inorganic particles to be added to the reaction system is preferably 150 to 20,000 nm, more preferably 150 to 15,000 nm, as described above. When the average particle diameter is smaller than 150 nm, their effect of forming protrusions on the surface is small and excellent handling properties such as slipperiness and winding property cannot be obtained disadvantageously. When the average particle diameter is larger than 20,000 nm, the particle diameters of the residual particles after the neutralization reaction are large, and voids formed by stretching the film become too large, thereby deteriorating abrasion resistance disadvantageously.

Means of controlling the particle diameters of the inorganic particles is preferably a method in which the particles are dispersed in a solvent and then, ground using such an apparatus as a sand grinder and the obtained dispersion is filtered to remove large particles.

The wholly aromatic polyamide in the present invention is produced by an acid chloride process. Polymerization may be carried out by an interfacial polymerization or solution polymerization. Of these, solution polymerization is preferred.

Preferred polymerization solvents which can be used in the solution polymerization include dimethylformamide, dimethylacetamide, N-methylpyrrolidone, N-methylcaprolactam, dimethyl sulfoxide, hexamethylphosphoryl triamide, tetramethyl urea and 1,3-dimethyl-2-imidazolidinone. They may be used alone or in combination of two or more. The polymerization solvent as a main component may be used in conjunction with other solvent.

To the polymerization solvent may be added an inorganic salt such as calcium chloride or lithium chloride in a suitable amount before, during or after polymerization to improve the solubility of the resulting polymer.

Acid components and amine components are reacted with each other substantially in equimolar amounts, but either one of the components may be used excessively to control the degree of polymerization.

A small amount of a monofunctional acid component or amine component may be used as a terminal capping agent.

An aliphatic or aromatic amine or quaternary ammonium salt may be added to a polymerization system to capture hydrogen chloride produced by the reaction.

Further, additives such as an ultraviolet absorber, dye, release agent and the like may be added in limits not prejudicial to the effect of the present invention.

After the reaction is substantially completed, the above inorganic particles having an average particle diameter of 150 to 20,000 nm are added to a reaction system to carry out a neutralization reaction. At this point, the inorganic particles are used in excess of an amount over the stoichiometric amount required for neutralization, as described above.

The production method of the wholly aromatic polyamide per se is detailed in JP-B 52-39719 (the term "JP-B" as used herein means an "examined Japanese patent publication"). The description of this publication is included as the description of this specification.

The wholly aromatic polyamide in the present invention may contain additives such as an antioxidant, antistatic agent and release agent, and other polymers in limits which do not impair the physical properties of the film.

The wholly aromatic polyamide in the present invention preferably contains inorganic particles having an average particle diameter of 5 to 2,000 nm in an amount of 0.001 to 10 parts by weight, more preferably 0.004 to 8 parts by weight, particularly preferably 0.01 to 5 parts by weight, based on 100 parts by weight of the wholly aromatic polyamide.

The wholly aromatic polyamide in the present invention preferably has a logarithmic viscosity, measured at 30° C. in concentrated sulfuric acid, of at least 0.5 dl/g, more preferably at least 1.0 dl/g. The logarithmic viscosity of the polymer before film formation is obtained by measuring at 30° C. in concentrated sulfuric acid the polymer which has been re-precipitated and separated after a polymer stock solution containing the wholly aromatic polyamide after polymerization has been added to a solvent such as an alcohol or water.

The biaxially oriented film of the present invention can be produced as follows.

After polymerization is carried out as described above, the polymer stock solution containing the wholly aromatic polyamide can be added to a solvent such as an alcohol or water, and the polymer can be re-precipitated, separated and then dissolved in a solvent again so that it can be used for the formation of a film. However, the polymer stock solution is preferably used directly or upon adjustment to an appropriate concentration, for the formation of a film. The adjustment of the concentration at this point may be made by concentration or dilution with a solvent. As the solvent may be used the same as those listed for the polymerization solvent.

The polymer stock solution prepared as described above is formed into a film by a solution film formation process. The solution film formation process is selected from dry-wet, dry and wet processes. Dry-wet and dry processes are preferred because a film having excellent surface properties is obtained.

When a film is formed by a wet process, the stock solution is preferably extruded into a film formation bath directly from a nozzle or extruded onto a support such as a drum and then introduced into a wet process bath together with the support. This bath is generally an aqueous medium and may contain an organic solvent or inorganic salt. By passing through the wet process bath, the contained salt or organic solvent can be extracted. The time required to pass through the wet process bath is preferably 10 seconds to 30 minutes, though it differs according to the thickness of a film.

The polymer passed through the wet process bath is stretched in a longitudinal direction, dried, stretched in a transverse direction and heat set. These treatments are preferably carried out at 100 to 500° C. for a total time of 1 second to 30 minutes.

When a film is formed by a dry-wet process, the stock solution is extruded onto a support such as a drum or endless belt to form into a thin film, a solvent is scattered from the thin film layer, and the film is dried until it achieves self-holding properties. Preferred drying conditions are a temperature of room temperature to 300° C. and a time of 60 minutes or less. The film after the drying step is separated from the support, introduced into a wet step to remove the salt and solvent from the film, stretched, dried and heat set, like the wet process.

When the dry process is employed, the film which has been dried on a drum or endless belt and achieved self-holding properties is separated from the support, dried to remove the residual solvent, stretched and heat set. These treatments are preferably carried out at a temperature of 100 to 500° C. for a total time of 1 second to 30 minutes.

The film is preferably stretched at an area stretch ratio of 5.0 times or more, more preferably 6.0 to 10.0 times.

The thickness of the biaxially oriented film of the present invention obtained by the above processes is not particularly limited but preferably 0.1 to 20 μm, more preferably 0.5 to 10 μm.

When the thickness of the film is within the above range, it shows excellent handling properties such as strength, slipperiness and winding property and high abrasion resistance, and can be advantageously used for a magnetic recording medium.

The biaxially oriented film of the present invention preferably has protrusions derived from the inorganic particles having an average particle diameter of 5 to 2,000 nm, at a density of $1 \times 10^1$ to $1 \times 10^8$/mm$^2$, more preferably $1 \times 10^1$ to $1 \times 10^5$/mm$^2$, on the surface. When the density of the protrusions is lower than $1 \times 10^1$/mm$^2$, friction coefficient becomes large, whereby good running properties are hardly obtained, winding property readily deteriorates and blocking between films is liable to occur disadvantageously. When the density of the protrusions is higher than $1 \times 10^8$/mm$^2$, electromagnetic conversion characteristics readily deteriorate disadvantageously.

The sum of Young's moduli in two directions intersecting at right angles (for example, a longitudinal direction and a transverse direction) on the plane of the biaxially oriented film of the present invention is preferably at least 2,000 kg/mm$^2$, more preferably at least 2,200 kg/mm$^2$. The preferred upper limit of the sum of Young's moduli is 4,000 kg/mm$^2$. When the sum of Young's moduli is less than 2,000 kg/mm$^2$ and this film is used as a base film for a magnetic recording medium, the contact between the magnetic recording medium and a magnetic head becomes inadequate, whereby electromagnetic conversion characteristics are liable to deteriorate and a base film having a thickness in the order of several micrometers cannot have sufficient strength disadvantageously.

The Young's modulus in at least one of the two directions intersecting at right angles is preferably at least 600 kg/mm$^2$.

The following two embodiments of the biaxially oriented films of the present invention are particularly preferred.

(i) A biaxially oriented film containing inorganic particles having an average particle diameter of 80 to 1,000 nm and having protrusions derived from the inorganic particles at a density of $1 \times 10^1$ to $1 \times 10^5$/mm$^2$ on the surface and a sum of Young's moduli in two directions intersecting at right angles on the film plane of at least 2,000 kg/mm$^2$.

(ii) A biaxially oriented film containing inorganic particles having an average particle diameter of 5 to 150 nm and having protrusions derived from the inorganic particles at a density of $5 \times 10^3$ to $1 \times 10^8$/mm$^2$ on the surface and a sum of Young's moduli in two directions intersecting at right angles on the film plane of at least 2,000 kg/mm$^2$.

The biaxially oriented film (i) preferably has a flexural rigidity of 3.0 to 9.5 mg·mm, more preferably 5.0 to 9.5 mg·mm, in one direction on the film plane. When the flexural rigidity in one direction, for example, in a longitudinal direction is less than 3.0 mg·mm or more than 9.5 mg·mm, the contact state between the film and the recording head is apt to be inadequate, thereby deteriorating electromagnetic conversion characteristics disadvantageously.

Further, the tensile strength at break of the film in a longitudinal direction is preferably 38 kg/mm$^2$ or more, more preferably 42 kg/mm$^2$ or more. When the tensile strength at break is less than 38 kg/mm$^2$, the film can hardly be used as a tape which runs and stops repeatedly.

The thermal shrinkage at 150° C. in one direction of the film is preferably less than 1%. When the thermal shrinkage is 1% or more, the reliability of the performance of the film is liable to be lost depending on the use environment of a recording medium disadvantageously.

Further, in the above biaxially oriented film (ii), elemental halogen ions are not detected from the surface of the film by photoelectric spectrophotometry. This biaxially oriented film is free from the damage of its magnetic metal thin film by elemental halogen even in a high-temperature and high-humidity environment and can retain its performance when it is used in a magnetic recording medium of a metal thin film type.

The biaxially oriented film of the present invention can be used by itself as a base film for a magnetic recording medium per se and it is also used as a base film for a magnetic recording medium after a coating layer is formed on the film.

It is particularly advantageous that the biaxially oriented film (i) be used as a base film after a coating layer is formed thereon.

Therefore, according to the present invention, there is also provided a base film for a magnetic recording medium, which has on at least one surface of the biaxially oriented film (i) of the present invention a coating layer comprising as a binder component a water-dispersible copolyester resin which comprises 40 to 99 mol % of 2,6-naphthalenedicarboxylic acid, 0.1 to 5 mol % of an aromatic dicarboxylc acid having a sulfonate salt group and 0 to 55 mol % of other aromatic dicarboxylic acid as the aromatic dicarboxylic acid components and 40 to 100 mol % of ethylene glycol, 0 to 60 mol % of an addition product of a bisphenol A with a lower alkylene oxide and 0 to 10 mol % of other glycol as glycol components, a surface not in contact with the biaxially oriented film of the coating layer having a surface roughness WRa of 0.5 to 10 nm and a WRz of 5 to 200 nm.

In the composition of the water-dispersible copolyester resin as the binder component of the coating layer, when the proportion of 2,6-naphthalenedicarboxylic acid is smaller than 40 mol %, the blocking resistance of the film lowers disadvantageously, while when the proportion is larger than 90 mol %, the copolyester resin is difficult to dissolve in a hydrophilic organic solvent in the step of dispersing the copolyester resin in water, thereby making difficult water dispersion. In this case, it is effective and preferred to improve non-crystallinity by copolymerizing glycol components. However, when the proportion of 2,6-naphthalenedicarboxylic acid is larger than 99 mol %, even if glycol components for improving non-crystallinity are copolymerized, the copolyester resin does not dissolve in a hydrophilic organic solvent any longer. Further, when the proportion of the aromatic dicarboxylic acid having a sulfonate salt group is smaller than 0.1 mol %, the hydrophilic nature of the copolyester resin deteriorates, thereby making difficult water dispersion disadvantageously. When the proportion is larger than 5 mol %, the blocking resistance of the film deteriorates disadvantageously.

Preferred examples of the aromatic dicarboxylic acid having a sulfonate salt group include 5-sodium sulfoisophthalic acid, 5-potassium sulfoisophthalic acid, 5-lithium sulfoisophthalic acid and 5-phosphonium sulfoisophthalic acid. For improving water dispersibility, alkaline metal salts such as 5-sodium sulfoisophthalic acid, 5-potassium sulfoisophthalic acid and 5-lithium sulfoisophthalic acid are more preferred.

The acid components of the copolyester resin include 2,6-naphthalenedicarboxylic acid and an aromatic dicarboxylic acid having a sulfonate salt group in the above proportions, and other aromatic dicarboxylic acid may be used in combination with these. Illustrative examples of the other aromatic dicarboxylic acid include terephthalic acid, isophthalic acid, phthalic acid, biphenyldicarboxylic acid and the like. Of these, isophthalic acid is particularly preferred.

When the proportion of ethylene glycol as a glycol component of the copolyester resin is smaller than 40 mol %, the blocking resistance of the film lowers disadvantageously.

The addition product of bisphenol A with a lower alkylene oxide which can be used in conjunction with ethylene glycol is a compound represented by the following formula:

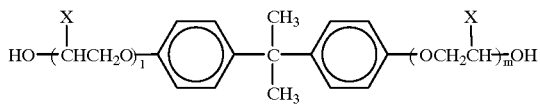

wherein X is H or lower alkyl having 1 to 5 carbon atoms, and l+m is an integer of 2 to 10. The use of the addition product of bisphenol A with a lower alkylene oxide is effective in improving the water dispersibility of the copolyester. Illustrative examples of the lower alkyl represented by X in the above formula include alkyl groups having 1 to 5 carbon atoms such as methyl, ethyl, propyl, butyl and pentyl. Of these, methyl is particularly preferred. The compound is particularly preferably an addition product of bisphenol A with propylene oxide. When the value of l+m increases, the blocking resistance of the copolymer lowers. Therefore, l+m is preferably as small as possible and the most preferably 2.

The additional product of bisphenol A with a lower alkylene oxide is preferably used in an amount of 10 to 50 mol %, more preferably 20 to 40 mol %, based on the total of all glycol components.

The glycol components of the copolyester include ethylene glycol and an addition product of bisphenol A with lower alkylene oxide in the above proportions. When the total proportion of these glycol components is smaller than 10 mol %, other aliphatic or alicyclic glycol can be used in combination with these. Preferred examples of the other aliphatic or alicyclic glycol include 1,4-butanediol, 1,4-cyclohexanedimethanol and the like.

The coating layer may contain fine particles having an average particle diameter of 10 to 50 nm in addition to the above binder component. The average particle diameter of the fine particles is preferably 15 to 40 nm. When the average particle diameter is smaller than 10 nm, the blocking resistance becomes insufficient, while when the average particle diameter is larger than 50 nm, the coating layer must be made thick to prevent the particles from falling off with the result that blocking resistance becomes insufficient. The content of the fine particles is 1 to 50 wt %, preferably 1 to 35 wt %, more preferably 1 to 25 wt % based on the weight of the copolyester resin.

Preferably, the fine particles have a relatively low specific gravity so that they hardly sediment in a coating solution. Preferred examples of the fine particles include fine particles of heat resistant polymers (such as cross-linked silicone resin, cross-linked acryl resin, cross-linked polystyrene, melamine, formaldehyde resin, aromatic polyamide resin, polyamide-imide resin, cross-linked polyester, wholly aromatic polyester and the like), silicon dioxide (silica) and calcium carbonate. Of these, cross-linked silicone resin fine particles, silica and core-shell type organic fine particles (core: cross-linked polystyrene, shell: polymethyl methacrylate) are particularly preferred.

When the above fine particles are contained, the thickness of the coating layer desirably satisfies the following equation (5):

$$0.2 \leq t/d \leq 2.0 \tag{5}$$

wherein t is a thickness (nm) of the coating layer, and d is an average particle diameter (nm) of the fine particles, preferably the following equation (6):

$$0.3 \leq t/d \leq 1.5 \tag{6}$$

wherein t and d are the same as defined in the equation (5), more preferably the following equation (7):

$$0.4 \leq t/d \leq 1.0 \tag{7}$$

wherein t and d are the same as defined in the equation (5), particularly preferably the following equation (8):

$$0.5 \leq t/d \leq 0.8 \tag{8}$$

wherein t and d are the same as defined in the equation (5).

When t/d (thickness of coating layer/average particle diameter of fine particles) is less than 0.2, the fine particles cannot be held by the binder and fall off in the step of forming a film or producing a magnetic tape so that many drop outs are produced and electromagnetic conversion characteristics are deteriorated. When t/d is more than 2.0, the number of particles projecting from the binder is reduced and sufficient blocking resistance cannot be obtained.

It is preferred that the fine particles should not agglomerate in the coating layer, and it is further preferred from the viewpoint of abrasion resistance that the density of agglomerates of 10 or more primary particles is 0 to 30/10 $\mu m^2$.

The center plane average roughness WRa of the surface (not in contact with the biaxially oriented film) of the coating layer is 0.5 to 10 nm, preferably 1 to 8 nm, more preferably 1.5 to 5 nm. When WRa is less than 0.5 nm, the slipperiness between the film and the pass roll degrades in the step of forming a film or producing a magnetic tape, the film is chipped so that many drop outs are produced and electromagnetic conversion characteristics deteriorate. When WRa is more than 10 nm, the magnetic surface becomes rough and satisfactory electromagnetic conversion characteristics cannot be obtained.

The 10-point average roughness WRz of the surface of the above film is 5 to 200 nm, preferably 10 to 150 nm, more preferably 15 to 100 nm. When WRz is less than 5 nm, the degassing property of the film to be wound on a roll degrades to make it difficult to obtain a good roll shape of the film, thereby greatly reducing product yield. When WRz is more than 200 nm, the magnetic surface becomes rough and satisfactory electromagnetic conversion characteristics cannot be obtained.

Coating for the formation of the coating layer can be carried out during or after film formation but preferably during film formation. Coating is preferably carried out after stretching and heat setting to prevent the excessive heating of the coating layer.

Coating may be carried out in accordance with a commonly used method, such as kiss coating, reverse coating, gravure coating, die coating or the like.

The thickness of the coating layer is 1 to 50 nm, preferably 5 to 35 nm. When the thickness is smaller than 1 nm, adhesion becomes insufficient, while when the thickness is larger than 50 nm, blocking resistance lowers. When the coating layer contains fine particles, it is desired that the relationship between the average particle diameter of the fine particles and the thickness of the coating layer should satisfy the above equations (5) to (8) as described above.

It is possible to contain other components in the coating layer as required in limits not prejudicial to the effect of the present invention for the purpose of improving slipperiness and preventing electrification.

A base film for a magnetic recording medium, which comprises the above biaxially oriented film (i) provided by the present invention and a coating layer on at least one surface side of the film (i) provides a coated high-density magnetic recording medium by forming a magnetic coating layer on the coating layer.

That is, according to the present invention, there are also provided a coated high-density magnetic recording medium which comprises the above biaxially oriented film (i) of the present invention and a magnetic coating layer formed on one side of the film (i) and a coated high-density magnetic recording medium which comprises the above base film for a magnetic recording medium having a coating layer on the biaxially oriented film (i) and a magnetic coating layer formed on the coating layer.

Magnetic coatings include metal-based magnetic coatings and metal oxide-based magnetic coatings.

The metal-based magnetic coatings are prepared by containing a magnetic metal or a magnetic material essentially composed of a magnetic metal in a binder, as exemplified by a coating prepared by uniformly dispersing iron or needle-like magnetic fine powders essentially composed of iron in vinyl chloride or vinyl chloride-vinyl acetate copolymer.

The metal oxide-based magnetic coating is prepared by containing a magnetic metal oxide or a magnetic material essentially composed of a magnetic metal oxide in a binder, as exemplified by a coating prepared by uniformly dispersing needle-like magnetic fine powders such as iron oxide or chromium oxide, or leaf-like magnetic fine powders such as barium ferrite in a binder such as vinyl chloride or vinyl chloride-vinyl acetate copolymer.

The magnetic coating is applied to ensure that the thickness of the obtained magnetic layer should be 2 $\mu$m or less, preferably 0.1 to 2 $\mu$m.

A coated magnetic recording medium for high-density recording which has excellent electromagnetic conversion characteristics such as output at a short-wavelength range, S/N and C/N, few drop outs and a small error rate can be obtained by forming a back coat layer on a side opposite to the magnetic layer in accordance with a known method.

Similarly, the above biaxially oriented film (ii) of the present invention can provide a high-density magnetic recording medium.

That is, according to the present invention, there are also provided a metal thin film high-density magnetic recording medium which comprises the above biaxially oriented film (ii) of the present invention and a deposited metal thin film on one surface side of the film (ii), and a multi-layer coated high-density magnetic recording medium which comprises the above biaxially oriented film (ii) of the present invention and a magnetic coating layer formed on one surface side of the film (ii), the magnetic coating layer consisting of a non-magnetic buffer coating layer formed on the surface of the biaxially oriented film directly and a magnetic coating layer formed on the buffer coating layer.

The metal thin film high-density magnetic recording medium is produced by forming a ferroelectric metal thin film layer made from iron, cobalt, chromium or an alloy or oxide thereof by vacuum deposition, sputtering, ion plating or the like on one surface of the biaxially oriented film (ii), a protective layer of diamond-like carbon (DLC) or the like and a fluorine-containing carboxylic acid-based lubricant layer on the surface of the ferroelectric metal thin film layer in the mentioned order according to purpose and application and as required and further a known back coat layer on a side opposite to the metal thin film layer.

This metal thin film high-density magnetic recording medium which has excellent electromagnetic conversion characteristics such as output at a short-wavelength range, S/N and C/N, few drop outs and a small error rate is extremely useful as a tape medium for Hi8 for analog signal recording, digital video cassette recorders (DVC) for digital signal recording, data 8 mm and DDSIV.

The multi-layer coated high-density magnetic recording medium is made multi-layered by dispersing titanium oxide fine particles in the same organic binder as that for the magnetic layers and applying the organic binder as a non-magnetic layer and the magnetic coating to at least one side of the biaxially oriented film (ii) of the present invention in this order.

The magnetic coating includes metal-based magnetic coating and metal oxide-based magnetic coating. The metal-based magnetic coating and the metal oxide-based magnetic coating are the same as those listed above.

The thickness of the magnetic layer is preferably 1.1 $\mu$m or less, more preferably 0.1 to 1.0 $\mu$m.

The thickness of the non-magnetic layer is preferably 0.1 to 2.0 $\mu$m, more preferably 0.2 to 1.5 $\mu$m.

A coated magnetic recording medium for high-density recording which has excellent electromagnetic conversion characteristics such as output at a short-wavelength range, S/N and C/N, few drop outs and a small error rate can be obtained by forming a back coat layer on a side opposite to the magnetic layer in accordance with a known method.

This multi-layer coated high-density magnetic recording medium is extremely useful as a tape medium for 8 mm video, Hi8, β-cam SP and W-VHS for analog signal recording, digital video cassette recorder (DVC) for digital signal recording, data 8 mm, DDSIV, digital β-cam, D2, D3, SX and data streamer QIC for digital signal recording.

The above W-VHS is a VTR for analog HDTV signal recording, and the DVC can be used for digital HDTV signal recording. It can be said that the aromatic polyamide film of the present invention is a base film extremely useful for a magnetic recording medium for VTRs for HDTV signal recording.

The following examples are given to further illustrate the present invention. It is to be understood that the present invention is not limited by the following examples and various changes and modifications may be made in the present invention without departing from the spirit and scope thereof. Physical properties and characteristic properties in the present invention were measured and defined as follows.

(1) pH of polymer solution

After 5 g of a polymer solution was collected, added to 300 ml of water and stirred for 2 minutes, pH of the resulting aqueous solution was measured.

(2) logarithmic viscosity

A polymer stock solution containing an aromatic polyamide after polymerization was added to a solvent such as an alcohol or water, and the logarithmic viscosity of a polymer which was re-precipitated and separated was measured at 30° C. in concentrated sulfuric acid.

(3) area stretch ratio

This was obtained by multiplying a stretch ratio in a longitudinal direction by a stretch ratio in a transverse direction of the film.

(4) average particle diameter of particles (a) average particle diameter of particles before addition to polymer solution Particles were measured for diameters using the centrifugal particle size analyzer Model CP-50 of Shimadzu Corporation. A particle diameter equivalent to 50 weight percent was read from a cumulative curve of diameters of the individual particles and the amount thereof calculated based on the obtained centrifugal sedimentation curve, and the obtained value was taken as an average particle diameter (refer to "Particle Size Measurement Technique" issued by Nikkan Kogyo Press, pp. 242–247, 1975).

(b) average particle diameter of particles contained in film

The film was dissolved in N-methylpyrrolidone (may be abbreviated as NMP hereinafter) containing 3 wt % of lithium chloride by stirring at 100° C. for 30 minutes and the residual film undissolved in NMP was measured in the same manner as in (a).

For confirmation, a similar sample prepared by encapsulating a small piece of the film in an epoxy resin (Epomount of Refinetec Co., Ltd.) was sliced to a thickness of 60 nm together with the resin using the Microtome 2050 of Reichert-Jung Co., Ltd., and the slice was observed by a transmission electron microscope (H-800 of Hitachi, Ltd.) to obtain the particle diameters of 25 cross sections of the particles A. The obtained particle diameters were averaged to obtain an average particle diameter. As a result, the same value as above was obtained.

(5) density of protrusions

25 Photos of the surface of the film were taken at random at an angle of 45° and a magnification of 5,000× using a scanning electron microscope (T-300 of JEOL Ltd.) to count the number of protrusions on the surface of the film. The number of protrusions per 1 mm² was calculated from the average of the count values.

(6) void ratio

The film was etched to a depth of 500 nm from the surface using a plasma reactor (PR31 of Yamato Kagaku Co., Ltd.). 25 Photos of the surface of the etched sample were taken at random at an angle of 0° and a magnification of 5,000× using a scanning electron microscope (T-300 of JEOL Ltd.) to measure the long diameter of a particle which appeared on the surface and the long diameter of a void around the particle. The void ratio was obtained from the following equation.

$$\text{void ratio} = (\text{long diameter of void})/(\text{long diameter of particle})$$

(7) mechanical properties
(a) Young's moduli

A sample was prepared by cutting the film to a width of 10 mm and a length of 150 mm, and this sample was pulled by a tensile tester (TENSILON of Toyo Baldwin Co., Ltd.) at a chuck interval of 100 mm and a pulling rate of 10 mm/min in a room adjusted to a temperature of 20° C. and a relative humidity of 50%. The Young's modulus was calculated from the tangent of a rising portion of the obtained stress-distortion curve.

(b) flexural rigidity

This was calculated based on the following equation from the inclination of the tangent of a rising portion of the obtained stress-distortion curve by pulling the film at a chuck interval of 100 mm and a pulling rate of 5 mm/min using the same apparatus and measurement conditions as in the measurement of Young's modulus.

$$\text{flexural rigidity (mg·mm)} = [(10^6(\text{mg/kg}) \times (\text{inclination of tangent (kg/mm}^2)) \times (\text{film thickness (mm)})^3]/12$$

(c) tensile strength at break

A stress at the time when the film was broken by pulling at a chuck interval of 100 mm and a pulling rate of 100 mm/min using the same apparatus and measurement conditions as in the measurement of Young's modulus was taken as break strength.

(8) thermal shrinkage

Ten 350 mm×350 mm samples of the film were prepared, two points were marked on a center portion of the sample to ensure that a gauge length ($L_0$ (mm)) between the two points should be 300 mm. Ten marked films were hung in a hot-air circulating constant temperature chamber maintained at 150° C. under no tension, these films were taken out from the chamber after they were held in the chamber for 30 minutes, and the length (L (mm)) between the two points of the films was measured. Thermal shrinkages obtained from the following equation were averaged.

$$\text{thermal shrinkage} = 100 \times [(L_0 - L)/L_0]$$

(9) winding property

After winding conditions at the time of slitting were optimized, the film was slit to obtain 10 rolls, each having a width of 560 mm and a length of 9,000 m and the rolls were then left for 1 week. The winding property of the rolls was evaluated based on the following criteria from the number of rolls which could be commercialized judging from occurrence of film wrinkles.

| number of commercializable rolls | criteria |
|---|---|
| 9 or more | ⊚ |
| 7 to 8 | ○ |
| 4 to 6 | X |
| 3 or less | XX |

(10) abrasion resistance (calendering)

This was evaluated using a three-roll mini-super calender (nylon roll×steel roll). The film was caused to run 2,000 m at a speed of 50 m/min at a processing temperature of 80° C. and a linear pressure of 200 kg/cm. This was judged from abrasion dust adhered to the nylon roll of the calender based on the following criteria.

| | |
|---|---|
| no abrasion dust on nylon roll | ⊚ |
| slight amount of abrasion dust on nylon roll | ○ |
| large amount of abrasion dust on nylon roll | X |

(11) electromagnetic conversion characteristics

A magnetic coating prepared as follows was applied to the surface of the film to a thickness of 1.2 μm, aligned in a DC magnetic field of 2,500 Gauss, dried by heating at 120° C. and subjected to super-calendering (linear pressure: 300 kg/cm, temperature: 90° C.), and the resulting film was wound up into a roll. This roll was left in an oven at 55° C. for 3 days.

<preparation of magnetic coating>

After the composition shown below was charged into a ball mill, kneaded for 16 hours and dispersed, 5 parts by weight of an isocyanate compound (Desmodule L of Bayer AG) was added to the ball mill and dispersed by high-speed shearing for 1 hour to prepare a magnetic coating.

| *composition of coating: | |
|---|---|
| needle-like Fe particles | 100 parts |
| vinyl chloride-vinyl acetate copolymer (Slec 7A of Sekisui Chemical Co., Ltd.) | 15 parts |
| thermoplastic polyurethane resin | 5 parts |
| chromium oxide | 5 parts |
| carbon black | 5 parts |
| lecithin | 2 parts |
| fatty acid ester | 1 part |

-continued

| *composition of coating: | |
|---|---|
| toluene | 30 parts |
| methyl ethyl ketone | 50 parts |
| cyclohexanone | 70 parts |

*used devices: 8 mm video tape recorder: EDV-600 of Sony Corp. S/N measurement: noise meter of Shibasoku Co., Ltd.

Further, a coating solution having the following composition was applied to the film surface opposite to the magnetic recording layer of the film to a thickness of 0.8 μm as a back coat layer, dried and cut to give a magnetic tape.

| *composition black coat layer: | |
|---|---|
| carbon black | 100 parts |
| thermoplastic polyurethane resin | 60 parts |
| isocyanate compound | 18 parts |
| (Colonate L of Nippon Polyuretha ne Kogyo Co., Ltd.) | |
| silicone oil | 0.5 part |
| methyl ethyl ketone | 250 parts |
| toluene | 50 parts |

The characteristic properties of the tape were measured using the following commercially available devices.
(a) S/N measurement
The S/N ratio of a magnetic video tape was measured and evaluated based on the following criteria using a value in Comparative Example 3 as a reference.

| larger than (reference value + 3 dB) | ⊙ |
|---|---|
| (reference value + 3 dB) ~ (reference value + 1 dB) | ○ |
| smaller than (reference value + 1 dB) | X |

(b) running durability
The tape was caused to run under high temperature and high humidity conditions of a temperature of 55° C. and a humidity of 75 %RH for continuous reproduction, a reproduced image was observed, and running durability was judged from the vibration of the image.

| image is not vibrated | ○ |
|---|---|
| image is vibrated | X |

EXAMPLE 1

25 mol % of paraphenylenediamine and 25 mol % of 3,4'-diaminodiphenyl ether as amine components and 50 mol % of terephthalic acid chloride as an acid component were polymerized in NMP (N-methylpyrrolidone). Meanwhile, calcium hydroxide having an average particle diameter of 8,000 nm (a product of Inoue Sekkai Co., Ltd.) was dispersed in NMP by a homogenizer, ground to an average particle diameter of 2,300 nm by a sand grinder and filtered with a filter (HDCII of 50 μm meshes manufactured by Nihon Pall Ltd.) to prepare an NMP slurry of calcium hydroxide having an average particle diameter of 1,500 nm. This slurry was added to the above polymer to ensure that an amount of calcium hydroxide became 50.3 mol % based on 50 mol % of terephthalic acid chloride, whereby a stock solution for film formation was obtained. This stock solution had a pH of 4.7. The polymer had a logarithmic viscosity of 3.5.

The obtained stock solution for film formation was heated at 100° C., cast onto a metal belt heated at 100° C. from a nozzle heated at 100° C., dried at 100° C. for 2 minutes and heated stepwise at 120° C. and then 150° C. to be dried for a total of 10 minutes so as to give an unoriented film having self-holding properties. This unoriented film was separated from the belt continuously and introduced into a water tank to remove the solvent and the salt, and then dried at 150° C. for 15 minutes.

The obtained unoriented film was stretched to 2.5 times between low-speed and high-speed rolls at a film temperature of 350° C., and then supplied to a stenter to be stretched to 3.0 times at 400° C. to give a biaxially oriented film. This biaxially oriented film was heat set at 400° C. for 1 minute to give an aromatic polyamide film having a final thickness of 4.0 μm.

The average particle diameter of the residual neutralizing agent contained in the obtained film was 300 nm. Other physical properties and characteristic properties of the film are shown in Table 1.

EXAMPLE 2

Calcium hydroxide which was the same neutralizing agent as in Example 1 was ground to an average particle diameter of 4,800 nm by a sand grinder and then, an NMP slurry was prepared directly. This slurry was added to the above polymer to ensure that an amount of calcium hydroxide became 50.06 mol % based on 50 mol % of terephthalic acid chloride, to prepare a stock solution A for film formation (pH: 5.2, logarithmic viscosity of the polymer: 3.5).

Meanwhile, calcium hydroxide which was the same neutralizing agent as in Example 1 was ground to an average particle diameter of 2,000 nm by a sand grinder and filtered with a filter (HDCII of 20 μm meshes manufactured by Nihon Pall Ltd.) to prepare an NMP slurry of calcium hydroxide having an average particle diameter of 600 nm. This slurry was added to the above polymer to ensure that an amount of calcium hydroxide became 51.5 mol % based on 50 mol % of terephthalic acid chloride, to prepare a stock solution B for film formation (pH: 4.8, logarithmic viscosity of the polymer: 3.5).

Further, these stock solutions A and B were mixed together in equal amounts to prepare a final stock solution, and an aromatic polyamide film was obtained in the same manner as in Example 1.

The particle size distribution curve of the residual neutralizing agent contained in the obtained film had peaks at 500 nm and 180 nm. The physical properties and characteristic properties of the film are shown in Table 1.

EXAMPLE 3

Calcium hydroxide which was the same neutralizing agent as in Example 1 was ground to an average particle diameter of 2,200 nm by a sand grinder and then, an NMP slurry was prepared directly. An aromatic polyamide film was obtained in the same manner as in Example 1 except that this slurry was added to the above polymer to ensure that an amount of calcium hydroxide became 52.3 mol % based on 50 mol % of terephthalic acid chloride, to prepare a stock solution for film formation (pH: 4.8, logarithmic viscosity of the polymer: 3.5). The physical properties and characteristic properties of the film are shown in Table 1.

EXAMPLE 4

Calcium hydroxide which was the same neutralizing agent as in Example 1 was ground to an average particle diameter of 2,000 nm by a sand grinder and filtered with a filter (HDCII of 20 μm meshes manufactured by Nihon Pall Ltd.) to prepare an NMP slurry of calcium hydroxide having an average particle of 600 nm. An aromatic polyamide film was obtained in the same manner as in Example 1 except that this slurry was added to the above polymer to ensure that an amount of calcium hydroxide became 50.4 mol % based on 50 mol % of terephthalic acid chloride, to prepare a stock solution for film formation (pH: 4.8, logarithmic viscosity of the polymer: 3.5). The physical properties and characteristic properties of the film are shown in Table 1.

EXAMPLE 5

Calcium hydroxide which was the same neutralizing agent as in Example 1 was ground to an average particle diameter of 2,000 nm by a sand grinder and filtered with a filter (HDCII of 20 μm meshes manufactured by Nihon Pall Ltd.) to prepare an NMP slurry of calcium hydroxide having an average particle of 600 nm. An aromatic polyamide film was obtained in the same manner as in Example 1 except that this slurry was added to the above polymer to ensure that an amount of calcium hydroxide became 57.3 mol % based on 50 mol % of terephthalic acid chloride, to prepare a stock solution for film formation (pH: 5.0, logarithmic viscosity of the polymer: 3.5). The physical properties and characteristic properties of the film are shown in Table 1.

EXAMPLE 6

An aromatic polyamide film was obtained in the same manner as in Example 1 except that the film was stretched to 2.0 times in a longitudinal direction and to 3.5 times in a transverse direction. The physical properties and characteristic properties of the film are shown in Table 1.

EXAMPLE 7

An aromatic polyamide film was obtained in the same manner as in Example 1 except that the film was stretched to 2.8 times in a longitudinal direction and to 2.8 times in a transverse direction. The physical properties and characteristic properties of the film are shown in Table 1.

EXAMPLE 8

An aromatic polyamide film was obtained in the same manner as in Example 1 except that calcium carbonate was used as a neutralizing agent. The physical properties and characteristic properties of the film are shown in Table 1.

EXAMPLE 9

An aromatic polyamide film was obtained in the same manner as in Example 1 except that magnesium hydroxide was used as a neutralizing agent. The physical properties and characteristic properties of the film are shown in Table 1.

EXAMPLE 10

An aromatic polyamide film was obtained in the same manner as in Example 1 except that the molar ratio of paraphenylenediamine to 3,4'-diaminodiphenyl ether as amine components was changed to 37.5/12.5 (total of 50 mol %). The physical properties and characteristic properties of the film are shown in Table 1.

EXAMPLE 11

An aromatic polyamide film was obtained in the same manner as in Example 1 except that the molar ratio of paraphenylenediamine to 3,4'-diaminodiphenyl ether as amine components was changed to 12.5/37.5 (total of 50 mol %). The physical properties and characteristic properties of the film are shown in Table 1.

COMPARATIVE EXAMPLE 1

An aromatic polyamide film was obtained in the same manner as in Example 1 except that a dried unoriented film was not stretched. The physical properties and characteristic properties of the film are shown in Table 2. The unoriented film had few protrusions on the surface, was inferior in slipperiness and winding property, and had low Young's moduli.

COMPARATIVE EXAMPLE 2

An aromatic polyamide film was obtained in the same manner as in Example 1 except that an NMP slurry of calcium hydroxide was added to a polymerization system to adjust pH to 3.8 so as to prepare a stock solution for film formation. Particles regarded as the residual neutralizing agent were not found in the obtained film. Other physical properties and characteristic properties of the film are shown in Table 2.

COMPARATIVE EXAMPLE 3

An aromatic polyamide film was obtained in the same manner as in Example 1 except that a stock solution for film formation (pH: 2.3) was prepared without adding an NMP slurry of a neutralizing agent to a polymerization system. Particles regarded as the residual neutralizing agent were not found in the obtained film. Other physical properties and characteristic properties of the film are shown in Table 2.

COMPARATIVE EXAMPLE 4

An aromatic polyamide film was obtained in the same manner as in Example 1 except that an NMP slurry of calcium hydroxide was added to a polymerization system to adjust pH to 3.8 and a pre-dispersed silica having an average particle diameter of 10 nm was further added to prepare a stock solution for film formation. Particles regarded as the residual neutralizing agent were not found in the obtained film. Other physical properties and characteristic properties of the film are shown in Table 2.

COMPARATIVE EXAMPLE 5

An aromatic polyamide film was obtained in the same manner as in Example 1 except that an NMP slurry of calcium hydroxide was added to a polymerization system to adjust pH to 3.8 and a pre-dispersed silica having an average particle diameter of 430 nm was further added to prepare a stock solution for film formation. Particles regarded as the residual neutralizing agent were not found in the obtained film. Other physical properties and characteristic properties of the film are shown in Table 2.

TABLE 1

| | Proportion of 3,4'-DAPE(*) (mol%) | particles of neutralizing agent (kind of particles, particle size before addition → particle size of particles contained in film) (nm) | stretch ratios (**) | density of protrusions (number/mm²) | void ratio |
|---|---|---|---|---|---|
| Ex. 1 | 25 | Ca(OH)₂ | 1500 → 300 | 2.5 × 3.0 (7.5) | 2.7 × 10³ | 1.05 |
| Ex. 2 | 25 | Ca(OH)₂ | 4800 → 500 | 2.5 × 3.0 (7.5) | 8.5 × 10¹ | 1.01 |
| | | Ca(OH)₂ | 600 → 180 | 10 | 1.8 × 10⁴ | |
| Ex. 3 | 25 | Ca(OH)₂ | 2200 → 800 | 2.5 × 3.0 (7.5) | 2.7 × 10³ | 1.03 |
| Ex. 4 | 25 | Ca(OH)₂ | 600 → 180 | 2.5 × 3.0 (7.5) | 2.0 × 10⁴ | 1.02 |
| Ex. 5 | 25 | Ca(OH)₂ | 600 → 300 | 2.5 × 3.0 (7.5) | 7.0 × 10⁴ | 1.03 |
| Ex. 6 | 25 | Ca(OH)₂ | 150 → 300 | 2.5 × 3.5 (7.0) | 2.9 × 10³ | 1.04 |
| Ex. 7 | 25 | Ca(OH)₂ | 1500 → 300 | 2.8 × 2.8 (7.8) | 2.6 × 10³ | 1.05 |
| Ex. 8 | 25 | CaCO₃ | 1500 → 300 | 2.5 × 3.0 (7.5) | 2.2 × 10³ | 1.03 |
| Ex. 9 | 25 | Mg(OH)₂ | 1500 → 300 | 2.5 × 3.0 (7.5) | 1.0 × 10³ | 1.03 |
| Ex. 10 | 12.5 | Ca(OH)₂ | 1500 → 300 | 2.5 × 3.0 (7.5) | 3.0 × 10³ | 1.02 |
| Ex. 11 | 37.5 | Ca(OH)₂ | 1500 → 300 | 2.5 × 3.0 (7.5) | 2.5 × 10³ | 1.03 |

| | Young's modulus (longitudinal and transverse directions) (kg/mm²) | flexural rigidity (longitudinal direction) (mg · mm) | break strength (longitudinal direction) (kg/mm²) | thermal shrinkage (maximum) (%) | winding property | abrasion resistance | S/N | running durability |
|---|---|---|---|---|---|---|---|---|
| Ex. 1 | 2500 | 7.0 | 45 | 0.3 | ⊚ | ⊚ | ⊚ | ○ |
| Ex. 2 | 2500 | 7.0 | 45 | 0.3 | ⊚ | ⊚ | ⊚ | ○ |
| Ex. 3 | 2500 | 7.0 | 45 | 0.3 | ⊚ | ⊚ | ○ | ○ |
| Ex. 4 | 2500 | 7.0 | 45 | 0.3 | ⊚ | ⊚ | ⊚ | ○ |
| Ex. 5 | 2500 | 7.0 | 45 | 0.3 | ⊚ | ⊚ | ○ | ○ |
| Ex. 6 | 2350 | 5.6 | 42 | 0.3 | ⊚ | ⊚ | ⊚ | ○ |
| Ex. 7 | 2600 | 7.8 | 49 | 0.3 | ⊚ | ⊚ | ⊚ | ○ |
| Ex. 8 | 2500 | 7.0 | 45 | 0.3 | ⊚ | ⊚ | ⊚ | ○ |
| Ex. 9 | 2500 | 7.0 | 45 | 0.3 | ⊚ | ⊚ | ⊚ | ○ |
| Ex. 10 | 2800 | 7.0 | 49 | 0.1 | ⊚ | ⊚ | ⊚ | ○ |
| Ex. 11 | 2300 | 7.0 | 42 | 0.5 | ⊚ | ⊚ | ⊚ | ○ |

(*): 3,4'-diaminodiphenyl ether
(**): stretch ratio in longitudinal direction × stretch ratio in transverse direction (area stretch ratio)

TABLE 2

| | Proportion of 3,4'-DAPE(*) (mol %) | particles of neutralizing agent (kind of particles, particle size before addition → particle size of particles contained in film) (nm) | stretch ratios (**) | density of protrusions (number/mm²) | void ratio |
|---|---|---|---|---|---|
| C. Ex. 1 | 25 | Ca(OH)₂ | 1500 → 300 | 1.0 × 1.0 (1.0) | not identified | 1.0 |
| C. Ex. 2 | 25 | Ca(OH)₂ | 1500 → lost | 2.5 × 3.0 (7.5) | none | — |
| C. Ex. 3 | 25 | -(not neutralized) | | 2.5 × 3.0 (7.5) | none | — |
| C. Ex. 4 | 25 | SiO₂ (externally added) | 10 → 10 | 2.5 × 3.0 (7.5) | 6.7 × 10⁴ (*) | 5.0 (**) |
| C. Ex. 5 | 25 | SiO₂ (externally added) | 430 → 430 | 2.5 × 3.0 (7.5) | 1.6 × 10³ (***) | 3.2 |

| | Young's modulus (longitudinal and transverse directions) (kg/mm²) | flexural rigidity (longitudinal direction) (mg · mm) | break strength (longitudinal direction) (kg/mm²) | thermal shrinkage (maximum) (%) | winding property | abrasion resistance | S/N | running durability |
|---|---|---|---|---|---|---|---|---|
| C. Ex. 1 | 1200 | 4.2 | 22 | 1.2 | X | ○ | X | X |
| C. Ex. 2 | 2500 | 7.0 | 45 | 0.3 | XX | ⊚ | ⊚ | ○ |
| C. Ex. 3 | 2500 | 7.0 | 45 | 0.3 | XX | ⊚ | ⊚ | ○ |
| C. Ex. 4 | 2500 | 7.0 | 45 | 0.3 | X | X | ○ | X |
| C. Ex. 5 | 2500 | 7.0 | 45 | 0.3 | ⊚ | X | X | X |

(*): 3,4'-diaminodiphenyl ether
(**): stretch ratio in longitudinal direction × stretch ratio in transverse direction (area stretch ratio)
(***): Protrusions which are considered to be formed by agglomerates are counted.
(****): Since the agglomeration of particles is marked, the void is calculated from the ratio of the long diameter of the whole agglomerate to the long diameter of a void.

EXAMPLE 12

25 mol % of paraphenylenediamine and 25 mol % of 3,4'-diaminodiphenyl ether as amine components and 50 mol % of terephthalic acid dichloride as an acid component were polymerized in NMP (N-methylpyrrolidone). Meanwhile, calcium hydroxide having an average particle diameter of 8,000 nm (a product of Inoue Sekkai Co., Ltd.) was dispersed in NMP by a homogenizer, ground to an average particle diameter of 1,000 nm by a sand grinder and filtered with a filter (HDCII of 5 μm meshes manufactured by Nihon Pall Ltd.) to prepare an NMP slurry of calcium hydroxide having an average particle diameter of 200 nm. This slurry was added to the above polymer to ensure that an amount of calcium hydroxide became 51.2 mol % based on 50 mol % of terephthalic acid dichloride, whereby a stock solution for film formation was obtained. This stock solution had a pH of 4.7. The polymer had a logarithmic viscosity of 3.5.

The obtained stock solution was heated at 100° C., cast onto a metal belt heated at 100° C. from a nozzle heated at 100° C., dried at 100° C. for 2 minutes and heated stepwise at 120° C. and then to 150° C. to be dried for a total of 10 minutes so as to give an unoriented film having self-holding properties. This unoriented film was separated from the belt continuously and introduced into a water tank to remove the solvent and the salt, and then dried at 150° C. for 15 minutes.

The obtained unoriented film was stretched to 2.5 times between low-speed and high-speed rolls at a film temperature of 350° C., and then supplied to a stenter to be stretched to 3.0 times at 400° C. to give a biaxially oriented film. This biaxially oriented film was heat set at 400° C. for 1 minute to give an aromatic polyamide film having a final thickness of 3.0 μm.

The average particle diameter of the residual neutralizing agent contained in the obtained film was 60 nm. Other physical properties and characteristic properties of the film are shown in Table 3.

EXAMPLE 13

Calcium hydroxide which was the same neutralizing agent as in Example 12 was ground to an average particle diameter of 2,000 nm by a sand grinder and filtered with a filter (HDCII of 10 μm meshes manufactured by Nihon Pall Ltd.) to prepare an NMP slurry of calcium hydroxide having an average particle diameter of 400 nm. An aromatic polyamide film was obtained in the same manner as in Example 12 except that this slurry was added to the above polymer to ensure that an amount of calcium hydroxide became 50.15 mol % based on 50 mol % of terephthalic acid dichloride to prepare a stock solution for film formation (pH: 5.1, logarithmic viscosity of the polymer: 3.5). The physical properties and characteristic properties of the film are shown in Table 3.

EXAMPLE 14

Calcium hydroxide which was the same neutralizing agent as in Example 12 was ground to an average particle diameter of 2,000 nm by a sand grinder and filtered with a filter (HDCII of 20 μm meshes manufactured by Nihon Pall Ltd.) twice to prepare an NMP slurry of calcium hydroxide having an average particle diameter of 650 nm. An aromatic polyamide film was obtained in the same manner as in Example 12 except that this slurry was added to the above polymer to ensure that an amount of calcium hydroxide became 50.05 mol % based on 50 mol % of terephthalic acid dichloride to prepare a stock solution for film formation (pH: 5.1, logarithmic viscosity of the polymer: 3.5). The physical properties and characteristic properties of the film are shown in Table 3.

EXAMPLE 15

Calcium hydroxide which was the same neutralizing agent as in Example 12 was ground to an average particle diameter of 2,000 nm by a sand grinder and filtered with a filter (HDCII of 20 μm meshes manufactured by Nihon Pall Ltd.) once to prepare an NMP slurry of calcium hydroxide having an average particle diameter of 800 nm. An aromatic polyamide film was obtained in the same manner as in Example 12 except that this slurry was added to the above polymer to ensure that an amount of calcium hydroxide became 50.1 mol % based on 50 mol % of terephthalic acid dichloride to prepare a stock solution for film formation (pH: 5.2, logarithmic viscosity of the polymer: 3.5). The physical properties and characteristic properties of the film are shown in Table 3.

EXAMPLE 16

Calcium hydroxide which was the same neutralizing agent as in Example 12 was ground to an average particle diameter of 2,000 nm by a sand grinder and filtered with a filter (HDCII of 15 μm meshes manufactured by Nihon Pall Ltd.) to prepare an NMP slurry of calcium hydroxide having an average particle diameter of 550 nm. An aromatic polyamide film was obtained in the same manner as in Example 12 except that this slurry was added to the above polymer to ensure that an amount of calcium hydroxide became 50.6 mol % based on 50 mol % of terephthalic acid dichloride to prepare a stock solution for film formation (pH: 5.3, logarithmic viscosity of the polymer: 3.5). The physical properties and characteristic properties of the film are shown in Table 3.

EXAMPLE 17

An aromatic polyamide film was obtained in the same manner as in Example 12 except that the film was stretched to 2.0 times in a longitudinal direction and to 3.5 times in a transverse direction. The physical properties and characteristic properties of the film are shown in Table 3.

EXAMPLE 18

An aromatic polyamide film was obtained in the same manner as in Example 12 except that the film was stretched to 2.8 times in a longitudinal direction and to 2.8 times in a transverse direction. The physical properties and characteristic properties of the film are shown in Table 3.

EXAMPLE 19

An aromatic polyamide film was obtained in the same manner as in Example 12 except that calcium carbonate was used as a neutralizing agent. The physical properties and characteristic properties of the film are shown in Table 3.

EXAMPLE 20

An aromatic polyamide film was obtained in the same manner as in Example 12 except that magnesium hydroxide was used as a neutralizing agent. The physical properties and characteristic properties of the film are shown in Table 3.

EXAMPLE 21

An aromatic polyamide film was obtained in the same manner as in Example 12 except that the molar ratio of paraphenylenediamine to 3,4'-diaminodiphenyl ether as amine components was changed to 37.5/12.5 (total of 50 mol %). The physical properties and characteristic properties of the film are shown in Table 3.

EXAMPLE 22

An aromatic polyamide film was obtained in the same manner as in Example 12 except that the molar ratio of paraphenylenediamine to 3,4'-diaminodiphenyl ether as amine components was changed to 12.5/37.5 (total of 50 mol %). The physical properties and characteristic properties of the film are shown in Table 3.

COMPARATIVE EXAMPLE 6

An aromatic polyamide film was obtained in the same manner as in Example 12 except that a dried unoriented film was not stretched. The physical properties and characteristic properties of the film are shown in Table 4. This unoriented film had few protrusions on the surface, was inferior in slipperiness and winding property and had low Young's moduli. Therefore, the film was inferior In electromagnetic conversion characteristics.

COMPARATIVE EXAMPLE 7

An aromatic polyamide film was obtained in the same manner as in Example 12 except that an NMP slurry of calcium hydroxide was added to a polymerization system to adjust pH to 3.8 so as to prepare a stock solution for film formation. Particles regarded as the residual neutralizing agent were not found in the obtained film. Other physical properties and characteristic properties of the film are shown in Table 4.

COMPARATIVE EXAMPLE 8

An aromatic polyamide film was obtained in the same manner as in Example 12 except that a stock solution for film formation (pH was 2.3) was prepared without adding an NMP slurry of a neutralizing agent to a polymerization system. Particles regarded as the residual neutralizing agent were not found in the obtained film. Other physical properties and characteristic properties of the film are shown In Table 4.

COMPARATIVE EXAMPLE 9

An aromatic polyamide film was obtained in the same manner as in Example 12 except that an unoriented film separated from a metal belt was dried at 200° C. for 30 minutes without desalting in a water tank. The physical properties and characteristic properties of the film are shown in Table 4.

COMPARATIVE EXAMPLE 10

An aromatic polyamide film was obtained in the same manner as in Example 12 except that an NMP slurry of calcium hydroxide was added to a polymerization system to adjust pH to 3.8 and a pre-dispersed silica having an average particle diameter of 10 nm was further added to prepare a stock solution for film formation. Particles regarded as the residual neutralizing agent were not found in the obtained film. Other physical properties and characteristic properties of the film are shown in Table 4.

TABLE 3

| | 3,4'-DAPE(*) (mol %) | particles of neutralizing agent (kind of particles, particle size before addition → particle size of particles contained in film) (nm) | | stretch ratios (**) | density of protrusions (number/mm$^2$) | void ratio |
|---|---|---|---|---|---|---|
| Ex. 12 | 25 | Ca(OH)$_2$ | 200 → 60 | 2.5 × 3.0 (7.5) | 2.4 × 10$^5$ | 1.01 |
| Ex. 13 | 25 | Ca(OH)$_2$ | 400 → 60 | 2.5 × 3.0 (7.5) | 3.0 × 10$^4$ | 1.01 |
| Ex. 14 | 25 | Ca(OH)$_2$ | 650 → 60 | 2.5 × 3.0 (7.5) | 8.0 × 10$^3$ | 1.01 |
| Ex. 15 | 25 | Ca(OH)$_2$ | 800 → 10 | 2.5 × 3.0 (7.5) | 7.5 × 10$^3$ | 1.01 |
| Ex. 16 | 25 | Ca(OH)$_2$ | 550 → 120 | 2.5 × 3.0 (7.5) | 3.9 × 10$^4$ | 1.03 |
| Ex. 17 | 25 | Ca(OH)$_2$ | 200 → 60 | 2.0 × 3.5 (7.0) | 2.6 × 10$^5$ | 1.04 |
| Ex. 18 | 25 | Ca(OH)$_2$ | 200 → 60 | 2.8 × 2.8 (7.8) | 2.3 × 10$^5$ | 1.05 |
| Ex. 19 | 25 | CaCO$_3$ | 200 → 60 | 2.5 × 3.0 (7.5) | 2.9 × 10$^5$ | 1.03 |
| Ex. 20 | 25 | Mg(OH)$_2$ | 200 → 60 | 2.5 × 3.0 (7.5) | 2.3 × 10$^5$ | 1.03 |
| Ex. 21 | 12.5 | Ca(OH)$_2$ | 200 → 60 | 2.5 × 3.0 (7.5) | 2.7 × 10$^5$ | 1.02 |
| Ex. 22 | 37.5 | Ca(OH)$_2$ | 260 → 60 | 2.5 × 3.0 (7.5) | 2.2 × 10$^5$ | 1.03 |

| | Young's modulus (longitudinal and transverse directions) (kg/mm$^2$) | detection of halogen | friction coefficient | pin abrasion | C/N | running durability | stability under moist and heat conditions |
|---|---|---|---|---|---|---|---|
| Ex. 12 | 2500 | ○ | ◎ | ◎ | ◎ | ○ | ◎ |
| Ex. 13 | 2500 | ○ | ◎ | ◎ | ◎ | ○ | ◎ |
| Ex. 14 | 2560 | ○ | ○ | ◎ | ◎ | ○ | ◎ |
| Ex. 15 | 2500 | ○ | ◎ | ◎ | ◎ | ○ | ◎ |
| Ex. 16 | 2500 | ○ | ◎ | ○ | ○ | ○ | ◎ |
| Ex. 17 | 2350 | ○ | ◎ | ◎ | ◎ | ○ | ◎ |
| Ex. 18 | 2600 | ○ | ◎ | ◎ | ◎ | ○ | ◎ |
| Ex. 19 | 2500 | ○ | ◎ | ◎ | ◎ | ○ | ◎ |
| Ex. 20 | 2500 | ○ | ◎ | ◎ | ◎ | ○ | ◎ |
| Ex. 21 | 2800 | ○ | ◎ | ◎ | ◎ | ○ | ◎ |
| Ex. 22 | 2300 | ○ | ◎ | ◎ | ◎ | ○ | ◎ |

(*): 3,4'-diaminodiphenyl ether
(**): stretch ratio in longitudinal direction x stretch ratio in transverse direction (area stretch ratio)

TABLE 4

| | Proportion of 3,4'-DAPE(*) (mol %) | particles of neutralizing agent (kind of particles, particle size before addition particle size of particles contained in film) (nm) | | stretch ratios (**) | density of protrusions (number/mm$^2$) | void ratio |
|---|---|---|---|---|---|---|
| C. Ex. 6 | 25 | Ca(OH)$_2$ | 200 → 60 | 1.0 × 1.0 (1.0) | not identified | 1.0 |
| C. Ex. 7 | 25 | Ca(OH)$_2$ | 1500 → lost | 2.5 × 3.0 (7.5) | none | — |
| C. Ex. 8 | 25 | -(not neutralized) | | 2.5 × 3.0 (7.5) | none | — |
| C. Ex. 9 | 25 | Ca(OH)$_2$ | 200 → 60 | 2.5 × 3.0 (7.5) | 2.4 × 10$^5$ | 1.01 |
| C. Ex. 10 | 25 | SiO$_2$ (externally added) | 10 → 10 | 2.5 × 3.0 (7.5) | 6.7 × 10$^4$ (*) | 5.0 (**) |

| | Young's modulus (longitudinal and transverse directions) (kg/mm$^2$) | detection of halogen | friction coefficient | pin abrasion | C/N | running durability | stability under moist and heat conditions |
|---|---|---|---|---|---|---|---|
| C. Ex. 6 | 1200 | ○ | X | ○ | X | X | ◎ |
| C. Ex. 7 | 2500 | ○ | XX | ◎ | ◎ | ○ | ◎ |
| C. Ex. 8 | 2500 | X | XX | ◎ | ◎ | ○ | X |
| C. Ex. 9 | 2500 | X (not desalted) | ◎ | ◎ | ◎ | ○ | X |
| C. Ex. 10 | 2500 | ○ | ○ | ◎ | X | ○ | ◎ |

(*): 3,4'-diaminodiphenyl ether
(**): stretch ratio in longitudinal direction x stretch ratio in transverse direction (area stretch ratio)
(***): Protrusions which are considered to be formed by agglomerates are counted.
(****): Since the agglomeration of particles is marked, the void is calculated from the ratio of the long diameter of the whole agglomerate to the long diameter of a void.

In above Table 3 and Table 4, halogen detection, friction coefficient, pin abrasion, C/N, running durability and moisture heat stability were measured and defined by the following methods.

(12) detection of halogen ions on film surface

A 10 mm×10 mm sample of the film was measured using an X-ray photoelectric spectrophotometer (ESCALAB-200 of VG Co., Ltd.) and an Mg—Kα line as an excitation X ray. The detection of halogen ions (F$^-$, Cl$^-$, Br$^-$, I$^-$) was judged from the obtained spectrum based on the following criteria.

| no halogen ions are detected | ○ |
|---|---|
| halogen ions are detected | X |

As for the detection of halogen ions, Cl$^-$ ions are considered to be existent when a peak derived from a 2p-orbit appears at a binding energy of less than 203 eV. As a peak derived from covalent Cl atoms which are not free Cl$^-$ ions appears at around 203 to 205 eV, it is distinguished from the above peak.

(13) friction coefficient

A static friction coefficient ($\mu_s$) under a load of 1 kg was measured in accordance with ASTM D1894-63 using a slippery measuring instrument (manufactured by Toyo Testor Co., Ltd.) and a glass plate as a sled plate. The obtained value was evaluated based on the following criteria.

| $\mu_s$ | criteria |
|---|---|
| less than 0.6 | ◎ |
| 0.6 to 0.8 | ○ |
| more than 0.8 | X |

(14) abrasion resistance (against pin)

Abrasion resistance was measured using an apparatus shown in FIG. 1 as follows. In FIG. 1, reference numeral 1 denotes a feed reel, 2 a tension controller, 3, 5, 6, 8, 9 and 11 free rollers, 4 a tension detector (inlet), 7 stainless steel SUS304 fixing pin (outer diameter: 5 mm, surface roughness Ra: 20 nm), 10 a tension detector (outlet), 12 a guide roller and 13 a take-up reel.

At a temperature of 20° C. and a humidity of 60 %RH, the film cut to a width of ½ inch was brought into contact with the fixing pin 7 at angle of θ=(90/180)π radian (90°) and caused to run 100 m at a speed of 2 m/min (inlet tension was fixed at 40 g), and abrasion resistance was judged based on the following criteria.

| No abrasion dust is adhered to the pin | ◎ |
|---|---|
| slight amount of abrasion dust is adhered to the pin | ○ |
| large amount of abrasion dust is adhered to the pin | X |

(15) electromagnetic conversion characteristics

Two 100% cobalt ferromagnetic thin film layers were formed on the surface of the film to have a total thickness of 0.02 μm (each layer had a thickness of about 0.01 μm) by a vapor deposition method. A diamond-like carbon (DLC) film layer and a fluorine-containing carboxylic acid-based lubricant layer were formed sequentially on the above surface of the thin film layers, and a back coat layer was formed on the surface opposite to the magnetic layer by a known method. Thereafter, the resulting film was slit into a 8 mm wide tape which was then loaded into a commercially available 8 mm video cassette. Then, the characteristic properties of this tape were measured using the following commercially available devices.

used devices:
8 mm video tape recorder: EDV-6000 of Sony Corp.
C/N measurement: noise meter of Shibasoku Co., Ltd.

(a) C/N measurement

A signal having a recording wavelength of 0.5 µm (frequency of about 7.4 MHz) was recorded, the ratio of values of its reproduction signal at 6.4 MHz and 7.4 MHz was taken as C/N of the tape, the C/N of a deposited tape for a commercially available 8 mm video was regarded as 0 dB, and C/N was evaluated with a relative value based on the following criteria.

| | |
|---|---|
| larger than (reference + 5 dB) | ⊙ |
| (reference + 5 dB) to (reference + 1 dB) | ○ |
| smaller than (reference + 1 dB) | X |

(b) running durability

The tape was caused to run at a temperature of 55° C. and a humidity of 75 %RH for continuous reproduction, a reproduced image was observed, and running durability was judged according to the vibration of the image.

| | |
|---|---|
| Image is not vibrated | ○ |
| Image is vibrated | X |

(16) stability under moist/heat conditions

After the tape was left to stand under the conditions of a temperature of 60° C. and a humidity of 80 %RH for 90 hours, stability under moist and heat conditions was evaluated according to the corrosion of the deposited surface by visual inspection and the count value of defects produced by the corrosion of the deposited surface by observation through an optical microscope based on the following criteria.

| visual inspection | microscope | criteria |
|---|---|---|
| no corrosion | less than 19/64 mm² | ⊙ |
| no corrosion | 19/64 mm² or more | ○ |
| corroded | | X |

EXAMPLE 23

The unoriented film obtained in Example 1 was stretched to 2.5 times between low-speed and high-speed rolls at a film temperature of 350° C. and then supplied to a stenter to be stretched to 3.0 times at 400° C. to give a biaxially oriented film. This biaxially oriented film was heat set at 400° C. for 1 minute, cooled to room temperature, coated with the following coating solution [I] in an amount of 1.0 g/m² using a roll coater (coating film thickness after drying: 10 nm), and dried with hot air at 210° C. for 30 seconds to give an easily adhesive biaxially oriented aromatic polyamide film having a final thickness of 4.0 µm.

The average particle diameter of the residual neutralizing agent contained in the obtained film was 300 nm. Other physical properties and characteristic properties of the film are shown in Table 7.

The coating solution [I] was prepared as follows.

<production of copolyester resin A>

90 parts by weight of dimethyl 2,6-naphthalenedicarboxylic acid, 6 parts by weight of dimethyl isophthalate, 4 parts by weight of 5-sodium sulfoisophthalic acid, 70 parts by weight of ethylene glycol and 30 parts by weight of an addition product of bisphenol A with ethylene oxide (represented by the following structural formula) were charged into an ester exchange reactor, 0.05 part by weight of tetrabuthoxytitanium was added to the reactor, temperature was increased to 230° C. in a nitrogen atmosphere, and the formed methanol was distilled off to carry out an ester exchange reaction.

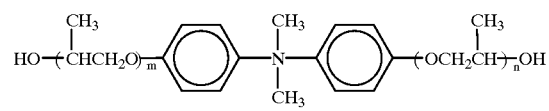

(m+n =4 (average value))

To this reaction system was then added 0.6 part by weight of Irganox 1010 (Ciba Geigy Co., Ltd.), temperature was elevated gradually to 255° C., and pressure inside the system was reduced to 1 mmHg to carry out a polycondensation reaction to give a copolyester resin A having an intrinsic viscosity (ocp) of 0.64.

The composition of this copolyester resin A is shown in Table 5.

<preparation of polyester dispersion in water "a">

20 Parts by weight of the copolyester resin A was dissolved in 80 parts by weight of tetrahydrofuran, and 180 parts by weight of water was added dropwise to the obtained solution under high-speed agitation of 10,000 rpm to give a semi-opaque dispersion tinted with blue. This dispersion was distilled at a reduced pressure of 20 mmHg to remove tetrahydrofuran. Thus, a polyester dispersion in water "a" having a solid content of 10 wt % was obtained.

<preparation of coating solution [I] for coating layer>

A water dispersion composition comprising 10 parts by weight of a 10 wt % aqueous solution of polyoxyethylene nonylphenyl ether as a surfactant and 90 parts by weight of the obtained polyester dispersion in water "a" was diluted with water to prepare an aqueous coating solution for a coating layer (solid content: 1.0 wt %). The composition is shown in Table 6.

Coating solutions [II] to [VI] used in the following examples and comparative examples were prepared as follows.

<preparation of coating solutions [II] to [VI] for coating layer>

Copolyesters B to F were prepared in the same manner as described above except that the compositions of the copolymers shown in Table 5 were used to prepare the corresponding water dispersions "b" to "f" in the same manner as described above. Coating solutions [II] to [VI] for coating layers were prepared using these water dispersions according to formulations shown in Table 6.

TABLE 5 composition of copolyester for coating layer (mol %)

| polyester | dicarboxylic acid components | | | glycol components | | dispersion in water (10%) |
|---|---|---|---|---|---|---|
| | NDCA | IPA | NSIPA | EG | BPA-P | |
| A | 90 | 6 | 4 | 70 | 40 | a |
| B | 98 | — | 2 | 90 | 10 | b |
| C | 60 | 38 | 2 | 100 | — | c |
| D | 60 | 32 | 8 | 70 | 30 | d |
| E | 30 | 68 | 2 | 100 | — | e |
| F | 60 | 38 | 2 | 30 | 70 | f |

NDCA: 2, 6-naphthalenedicarboxylic acid
IPA: isophthalic acid
NSIPA: 5-sodium sulfoisophthalic acid
EG: ethylene glycol
BPA-P: addition product of bisphenol A with propylene oxide

TABLE 6 composition of coating solution for coating layer

| | polyester | | weight ratio of surfactant | concentration of coating solution (wt %) |
|---|---|---|---|---|
| | kind | weight ratio | | |
| [I] | a | 90 | 10 | 1 |
| [II] | b | 90 | 10 | 1 |
| [III] | c | 90 | 10 | 1 |
| [IV] | d | 90 | 10 | 1 |
| [V] | e | 90 | 10 | 1 |
| [VI] | f | 90 | 10 | 1 |

Surfactant: polyoxyethylene nonylphenyl ether

EXAMPLE 24

The procedure of Example 23 was repeated for the film of Example 2. The particle size distribution curve of the residual neutralizing agent contained in the obtained film had maximum peaks at 500 nm and 180 nm. Other physical properties and characteristic properties of the film are shown in Table 7.

EXAMPLE 25

Calcium hydroxide which was the same neutralizing agent as in Example 23 was ground to an average particle diameter of 2,000 nm by a sand grinder and filtered with a filter (HDCII of 20 μm meshes manufactured by Nihon Pall Ltd.) to prepare an NMP slurry of calcium hydroxide having an average particle diameter of 600 nm. An aromatic polyamide film was obtained in the same manner as in Example 23 except that this slurry was added to the above polymer to ensure that an amount of calcium hydroxide became 50.4 mol % based on 50 mol % of terephthalic acid dichloride, to prepare a stock solution for film formation (pH: 4.8, logarithmic viscosity of the polymer: 3.5).

The average particle diameter of the residual neutralizing agent contained in the obtained film was 180 nm. Other physical properties and characteristic properties of the film are shown in Table 7.

EXAMPLE 26

The procedure of Example 23 was repeated for the film of Example 3. The average particle diameter of the residual neutralizing agent contained in the obtained film was 800 nm. Other physical properties and characteristic properties of the film are shown in Table 7.

EXAMPLE 27

The procedure of Example 23 was repeated for the film of Example 5. The average particle diameter of the residual neutralizing agent contained in the obtained film was 300 nm. Other physical properties and characteristic properties of the film are shown in Table 7.

EXAMPLE 28

An aromatic polyamide film was obtained in the same manner as in Example 24 except that a dried unoriented film was stretched to 2.0 times in a longitudinal direction and to 3.5 times in a transverse direction. The physical properties and characteristic properties of the film are shown in Table 7.

EXAMPLE 29

An aromatic polyamide film was obtained in the same manner as in Example 24 except that a dried unoriented film was stretched to 2.8 times in a longitudinal direction and to 2.8 times in a transverse direction. The physical properties and characteristic properties of the film are shown in Table 7.

EXAMPLES 30 AND 31

Aromatic polyamide films were obtained in the same manner as in Example 24 except that the coating solutions [II] and [III] were used in Examples 30 and 31, respectively. The physical properties and characteristic properties of the film are shown in Table 7.

COMPARATIVE EXAMPLE 11

An aromatic polyamide film was obtained in the same manner as in Example 23 except that a dried unoriented film was not stretched. The physical properties and characteristic properties of the film are shown in Table 8. This unoriented film had few protrusions on the surface, was inferior in slipperiness and winding property and had low Young's moduli. Therefore, the film was inferior in electromagnetic conversion characteristics.

COMPARATIVE EXAMPLE 12

An aromatic polyamide film was obtained in the same manner as in Example 23 except that an NMP slurry of calcium hydroxide was added to a polymerization system to adjust pH to 3.8 so as to prepare a stock solution for film formation. Particles regarded as the residual neutralizing agent were not found in the obtained film. Other physical properties and characteristic properties of the film are shown in Table 8. This film having no protrusions on the surface was inferior in blocking resistance.

COMPARATIVE EXAMPLE 13

An aromatic polyamide film was obtained in the same manner as in Example 23 except that an NMP slurry of calcium hydroxide having an average particle diameter of 13,500 nm which was prepared without being ground by a sand grinder was added to a polymerization system to ensure that an amount of calcium hydroxide became 50.3 mol % based on 50 mol % of terephthalic acid dichloride. The average particle diameter of the residual neutralizing agent contained in the obtained film was 2,250 nm. Other physical properties and characteristic properties of the film are shown in Table 8. Since the particle diameters of particles contained in the film were outside the range of the present invention, abrasion resistance was unsatisfactory and appropriate surface smoothness was lost. Therefore, the film was inferior in electromagnetic conversion characteristics.

COMPARATIVE EXAMPLES 14 TO 16

Aromatic polyamide films were obtained in the same manner as in Example 24 except that coating solutions [IV] to [VI] for coating layers were used in Comparative Examples 14 to 16, respectively. The physical properties and characteristic properties of the films are shown in Table 8.

TABLE 7

| | particles of neutralizing agent* | | stretch ratio | coating solution | density of protrusions** | | void rate |
|---|---|---|---|---|---|---|---|
| Ex. 23 | Ca(OH)$_2$ 1500 nm$^\phi$ → 300 nm$^\phi$ | | 2.5 × 3.0 | [I] (1%) | 2.7 × 10$^3$ per mm$^2$ | b) | 1.05 |
| Ex. 24 | Ca(OH)$_2$ 6000 nm$^\phi$ → 500 nm$^\phi$ | Ca(OH)$_2$ 700 nm$^\phi$ → 180 nm$^\phi$ | 2.5 × 3.0 | [I] (1%) | 8.5 $^{a)}$ × 10$^1$ per mm$^2$ | 1.8 $^{b)}$ × 10$^4$ per mm$^2$ | 1.01 |
| Ex. 25 | Ca(OH)2 600 nm$^\phi$ → 120 nm$^\phi$ | | 2.5 × 3.0 | [I] (1%) | 2.0 × 10$^4$ per mm$^2$ | b) | 1.02 |
| Ex. 26 | Ca(OH)$_2$ 2200 nm$^{526}$ → 800 nm$^\phi$ | | 2.5 × 3.0 | [I] (1%) | 2.7 × 10$^3$ per mm$^2$ | b) per mm$^2$ | 1.03 1.03 |
| Ex. 27 | Ca(OH)$^2$ 600 nm$^\phi$ → 300 nm$^\phi$ | | 2.5 × 3.0 | [I] (1%) | 7.0 × 10$^4$ per mm$^2$ | b) | 1.03 |
| Ex. 28 | Ca(OH)$_2$ 6000 nm$^\phi$ → 500 nm$^\phi$ | Ca(OH)$_2$ 700 nm$^\phi$ → 180 nm$^\phi$ | 2.0 × 3.0 | [I] (1%) | 9.1 $^{a)}$ × 10$^1$ per mm$^2$ | 1.9 $^{b)}$ × 10$^4$ per mm$^2$ | 1.04 |
| Ex. 29 | Ca(OH)$_2$ 6000 nm$^\phi$ → 500 nm$^\phi$ | Ca(OH)$_2$ 700 nm$^\phi$ → 180 nm$^\phi$ | 2.8 × 3.0 | [I] (1%) | 8.1 $^{a)}$ × 10$^1$ per mm$^2$ | 1.7 $^{b)}$ × 10$^4$ per mm$^2$ | 1.05 |
| Ex. 30 | Ca(OH)$_2$ 6000 nm$^\phi$ → 500 nm$^\phi$ | Ca(OH)$_2$ 700 nm$^\phi$ → 180 nm$^\phi$ | 2.5 × 3.0 | [II] (1%) | 8.5 $^{a)}$ × 10$^1$ per mm$^2$ | 1.8 $^{b)}$ × 10$^4$ per mm$^2$ | 1.01 |
| Ex. 31 | Ca(OH)$_2$ 6000 nm$^\phi$ → 500 nm$^\phi$ | Ca(OH)$_2$ 700 nm$^\phi$ → 180 nm$^\phi$ | 2.5 × 3.0 | [III] (1%) | 8.5 $^{a)}$ × 10$^1$ per mm$^2$ | 1.8 $^{b)}$ × 10$^4$ per mm$^2$ | 1.01 |

| | Young's modulus (longitudinal and transverse directions) | WRa/WRz | abrasion resistance | adhesion of MAG layer | blocking with wet heat | S/N |
|---|---|---|---|---|---|---|
| Ex. 23 | 2500 kg/mm$^2$ | 5 nm/70 nm | ◎ | ○ | ○ | ◎ |
| Ex. 24 | 2500 kg/mm$^2$ | 4 nm/90 nm | ◎ | ○ | ○ | ◎ |
| Ex. 25 | 2500 kg/mm$^2$ | 3 nm/40 nm | ◎ | ○ | ○ | ◎ |
| Ex. 26 | 2500 kg/mm$^2$ | 8 nm/160 nm | ◎ | ○ | ○ | ○ |
| Ex. 27 | 2500 kg/mm$^2$ | 8 nm/80 nm | ◎ | ○ | ○ | ○ |
| Ex. 28 | 2350 kg/mm$^2$ | 4 nm/85 nm | ◎ | ○ | ○ | ◎ |
| Ex. 29 | 2600 kg/mm$^2$ | 4 nm/95 nm | ◎ | ○ | ○ | ◎ |

TABLE 7-continued

| Ex. 30 | 2500 kg/mm$^2$ | 4 nm/90 nm | ◎ | ○ | ○ | ◎ |
|---|---|---|---|---|---|---|
| Ex. 31 | 2500 kg/mm$^2$ | 4 nm/90 nm | ◎ | ○ | ○ | ◎ |

*: kind of particle, particle size before addition, particle size of particles contained in film
**: $^{a)}$: observed by the method (19) and $^{b)}$: observed by the method (5)

TABLE 8

| | particles of neutralizing agent* | | stretch ratio | coating solution | density of protrusions** | | void rate |
|---|---|---|---|---|---|---|---|
| C. Ex. 11 | Ca(OH)$_2$ 1500 nm$^\phi$ → 300 nm$^\phi$ | | 1.0 × 1.0 | [I] (1%) | not identified | | 1.0 |
| C. Ex. 12 | Ca(OH)$_2$ 1500 nm$^\phi$ → lost | | 2.5 × 3.0 | [I] (1%) | none | | — |
| C. Ex. 13 | Ca(OH)$_2$ 13500 nm$^\phi$ → 2250 nm$^\phi$ | | 2.5 × 3.0 | [I] (1%) | 3.5 × 10$^{1\ a)}$ | per mm$^2$ | 1.8 |
| C. Ex. 14 | Ca(OH)$_2$ 6000 nm$^\phi$ → 500 nm$^\phi$ | Ca(OH)$_2$ 700 nm$^\phi$ → 180 nm$^\phi$ | 2.5 × 3.0 | [IV] (1%) | 8.5 $^{a)}$ ×10$^1$ per mm$^2$ | 1.8 $^{b)}$ × 10$^4$ per mm$^2$ | 1.01 |
| C. Ex. 15 | Ca(OH)$_2$ 6000 nm$^\phi$ → 500 nm$^\phi$ | Ca(OH)$_2$ 700 nm$^\phi$ → 180 nm$^\phi$ | 2.5 × 3.0 | [V] (1%) | 8.5 $^{a)}$ × 10$^1$ per mm$^2$ | 1.8 $^{b)}$ × 10$^4$ per mm$^2$ | 1.01 |
| C. Ex. 16 | Ca(OH)$_2$ 6000 nm$^\phi$ → 500 nm$^\phi$ | Ca(OH)$_2$ 700 nm$^\phi$ → 180 nm$^\phi$ | 2.5 × 3.0 | [VI] (1%) | 8.5 $^{a)}$ × 10$^1$ per mm$^2$ | 1.8 $^{b)}$ × 10$^4$ per mm$^2$ | 1.01 |

| | Young's modulus (longitudinal and transverse directions) | WRa/WRz WRa/WRz | abrasion resistance | adhesion of MAG layer | blocking adhesion of wet/heat conditions | under S/N |
|---|---|---|---|---|---|---|
| C. Ex. 11 | 1200 kg/mm$^2$ | 2 nm/9 nm | ○ | ○ | Δ | X |
| C. Ex. 12 | 2500 kg/mm$^2$ | 1 nm/6 nm | ◎ | ○ | X | ○ |
| C. Ex. 13 | 2500 kg/mm$^2$ | 30 nm/500 nm | X | ○ | ○ | X |
| C. Ex. 14 | 2500 kg/mm$^2$ | 4 nm/90 nm | ◎ | ○ | X | ◎ |
| C. Ex. 15 | 2500 kg/mm$^2$ | 4 nm/90 nm | ◎ | ○ | X | ◎ |
| C. Ex. 16 | 2500 kg/mm$^2$ | 4 nm/9 nm | ◎ | ○ | X | ◎ |

*: kind of particle, particle size before addition, particle size of particles contained in film
**: $^{a)}$: observed by the method (19) and $^{b)}$: observed by the method (5)

In the above Examples 23 to 31 and Comparative Examples 11 to 16, the following physical property values were measured and defined by the following methods.

(17) average particle diameter of colloidal particles added to adhesive layer

The average particle diameter of colloidal particles was calculated using an image analyzer (Luzex 500 of Nippon Regulator Co., Ltd.) by photographing each particle at a magnification corresponding to the size of each particle with a scanning electron microscope.

(18) coating thickness

A small piece of the film was encapsulated in an epoxy resin (Epomount of Refinetec Co., Ltd.) and sliced to a thickness of 60 nm together with the resin using the Microtome 2050 of Reichert-Jung Co., Ltd. The slice was observed through a transmission electron microscope (H-800 of Hitachi, Ltd.) and the interface of the coating layer was searched for to obtain the thickness of the coating layer.

(19) density of protrusions

The above method (5) or the following method (19) was used according to a sample to be inspected. Methods used in Examples and Comparative Examples are shown in Table 7.

25 Photos of the surface of the film were taken at random at a magnification of 50× using an optical microscope to count protrusions on the surface. The number of protrusions per 1 $mm^2$ was calculated from the average of measurement values.

(20) surface roughness (WRa, WRz)

The center plane average roughness (WRa) and the 10-point average roughness (WRz) were obtained using a surface analyzing software built in the non-contact 3-D roughness meter (TOPO-3D) of WYKO Co., Ltd. by conducting measurement under conditions of a 242 $\mu$m×239 $\mu$m (0.058 $mm^2$) measurement area at 10 or more sites and at a measurement magnification of 40×.

a) center plane average roughness (WRa)

This is a value calculated from the following expression and output.

$$WRa = \sum_{k=1}^{M} \sum_{j=1}^{N} \frac{|Z_{jk} - \overline{Z}|}{M \cdot N} \quad \left( \text{provided } \overline{Z} = \sum_{k=1}^{M} \sum_{j=1}^{N} \frac{Z_{jk}}{M \cdot N} \right)$$

$Z_{jk}$ is a height on a 2-D roughness chart at a j-th position and a k-th position in a measurement direction (242 $\mu$m) and a direction perpendicular to the direction (239 $\mu$m) when these directions are divided into M and N sections, respectively.

(b) 10-point average roughness (WRz)

The average roughness WRz is obtained by averaging the roughnesses of the first to fifth highest peaks (Hp) and the first to fifth deepest valleys (Hv).

$$WRz = \frac{\sum_{m=1}^{5} H_p(m) - \sum_{n=1}^{5} H_v(n)}{5}$$

(21) abrasion resistance (calendering)

This was evaluated using a three rolls mini-super calender (nylon roll×steel roll). The film was caused to run 2,000 m at a speed of 50 m/min at a processing temperature of 80° C. and a linear pressure of 200 kg/cm. Abrasion resistance was judged from abrasion dust adhered to the nylon roll of the calender based on the following criteria.

| | |
|---|---|
| no abrasion dust on nylon roll | ⊙ |
| small amount of abrasion dust on nylon roll | ○ |
| large amount of abrasion dust on nylon roll | X |

(22) adhesion of magnetic layer (MAG)

The following magnetic coating was applied to the film (coated with a primer), Scotch tape No. 600 (a product of 3M Co., Ltd.) measuring 19.4 mm in width and 8 cm in length was affixed to this film in such a manner that an air bubble was not included therebetween, the tape was rolled by a manual load roll specified in JIS C2701 (1975), and a 5 cm adhesive laminate portion of this sample was peeled off at a right angle using the Tensilon UM-11 of Toyo Baldwin Co., Ltd. at a head speed of 300 mm/min to obtain peel strength. A value in unit of g/cm was obtained by dividing this peel strength by the width of the tape. In the peeling-off, the laminate was set in such a manner that the tape was located on the lower side and a chuck interval was 5 cm. preparation of magnetic coating for evaluation;

43.9 parts by weight of a 40 wt % solution of nitrocellulose (flakes containing 25% of isopropanol) (RS1/2 of Daicel Co., Ltd.) (lacquer thinner for coating), 32.5 parts by weight of a polyester resin (Desmophen #1700 of Bayer AG), 26.0 parts by weight of chromium dioxide magnetic powders, 1 part by weight of soybean oil fatty acid (Recion P of Riken Vitamin Co., Ltd.), 0.5 part by weight of a cationic activator (Cation AB of NOF Corp.), 0.8 part by weight of squalene (shark liver oil) as dispersant/wetting agents and 282 parts by weight of a mixed solution of methyl ethyl ketone, cyclohexanone and toluene (weight ratio of 3/4/3) were charged into a ball mill, mixed and fully ground to prepare a mother coating (concentration of 45 wt %).

To 50 parts by weight of this mother solution were added 48 parts by weight of an addition reaction product between trimethylol propane and toluylene diisocyanate (Colonate L of Nippon Polyurethane Kogyo Co., Ltd.) and 6.25 parts by weight of butyl acetate to finally obtain a magnetic coating having a concentration of 42.7 wt % for evaluation.

Evaluation was carried out from peel strength based on the following criteria.

| | |
|---|---|
| more than 40 g/cm | ○ |
| 30 to 40 g/cm | Δ |
| less than 30 g/cm | X |

(23) blocking under moist/heat condition

Two films were superposed together in such a manner that a treated side of one film and an untreated side of the other film were in contact with each other, and applied with a pressure of 6 $kg/cm^2$ in an environment of 60° C. and 80 %RH for 17 hours. These films were peeled off from each other and blocking with moist heat was evaluated from its peeling (g/5 cm in width).

Evaluation was made from peeling based on the following criteria.

| | |
|---|---|
| less than 10 g/5 cm | ○ |
| 10 to 15 g/5 cm | Δ |
| more than 15 g/5 cm or rupture | X |

EXAMPLE 32

The unoriented film obtained in the course of Example 1 was stretched to 2.5 times between low-speed and high-speed rolls at a film temperature of 350° C. and then supplied to a stenter to be stretched to 3.0 times at 400° C. to give a biaxially oriented film. This biaxially oriented film was heat set at 400° C. for 1 minute, cooled to room temperature, coated with the following coating solution [VII] in an amount of 1.0 $g/m^2$ using a roll coater, and dried with hot air at 210° C. for 30 seconds to give an adhesive biaxially oriented aromatic polyamide film having a final thickness of 4.0 $\mu$m.

The average particle diameter of the residual neutralizing agent contained in the obtained film was 300 nm. Other physical properties and characteristic properties of the film are shown in Table 10.

The coating solution [VII] was prepared as follows.

A water dispersion composition comprising 100 parts by weight of the above polyester dispersion in water "a", 3.5 parts by weight of a 10 wt % water dispersion of cross-linked acryl particles having an average particle diameter of 20 nm and 11.5 parts by weight of a 10 wt % aqueous solution of polyoxyethylene nonylphenyl ether was diluted with water to prepare an aqueous coating solution [VII] for a coating layer (solid content of 10 wt %).

Coating solutions [VIII] to [XIX] used in the following examples and comparative examples were prepared as follows.

<preparation of coating solutions [VII] to [XIX] for coating layers>

The copolyesters B to F listed in the above Table 5 were used to prepare the corresponding dispersions in water "b" to "f" in the same manner as described above, and coating solutions [VII] to [XIX] for coating layers were prepared in accordance with formulations shown in Table 9.

TABLE 9 composition of coating solution for coating layer

| | polyester | | colloidal particle | | weight ratio of surfactant | concentration of coating solution (wt %) |
|---|---|---|---|---|---|---|
| | kind | weight ratio | kind | particle size(d) | weight ratio | |
| [VII] | a | 100 | acryl | 20 nm<sup>ϕ</sup> | 3.5 | 11.5 | 1 |
| [VII] | a | 100 | acryl | 20 nm<sup>ϕ</sup> | 3.5 | 11.5 | 1.5 |
| [IX] | a | 100 | acryl | 40 nm<sup>ϕ</sup> | 7.1 | 10.6 | 1 |
| [X] | a | 100 | core-shell | 25 nm<sup>ϕ</sup> | 2.3 | 11.4 | 1 |
| [XI] | a | 100 | silica | 17 nm<sup>ϕ</sup> | 4.7 | 11.6 | 1 |
| [XII] | a | 100 | silica | 25 nm<sup>ϕ</sup> | 4.7 | 11.6 | 1 |
| [XII] | a | 100 | silica | 8 nm<sup>ϕ</sup> | 4.7 | 11.6 | 1 |
| [XIV] | a | 100 | silica | 67 nm<sup>ϕ</sup> | 1.4 | 12.8 | 1 |
| [XV] | b | 100 | acryl | 20 nm<sup>ϕ</sup> | 3.5 | 11.5 | 1 |
| [XVI] | c | 100 | acryl | 20 nm<sup>ϕ</sup> | 3.5 | 11.5 | 1 |
| [XVII] | d | 100 | acryl | 20 nm<sup>ϕ</sup> | 3.5 | 11.5 | 1 |
| [XVIII] | e | 100 | acryl | 20 nm<sup>ϕ</sup> | 3.5 | 11.5 | 1 |
| [XIX] | f | 100 | acryl | 20 nm<sup>ϕ</sup> | 3.5 | 11.5 | 1 |

Notes)
acryl: polymethyl methacrylate-divinylbenzene cross-linked product
core-shell type: core (total diameter/core diameter 1.25): polystyrene-divinylbenzene cross-linked product, shell: polymethyl methacrylate
silica: colloidal silica
surfactant: polyoxyethylene nonylphenyl ether

EXAMPLE 33

The procedure of Example 32 was repeated for the film of Example 2. The particle size distribution curve of the residual neutralizing agent contained in the obtained film had maximum peaks at 500 nm and 180 nm. Other physical properties and characteristic properties of the film are shown in Table 10.

EXAMPLE 34

The procedure of Example 32 was repeated for the film of Example 4. The average particle diameter of the residual neutralizing agent contained in the obtained film was 180 nm. Other physical properties and characteristic properties of the film are shown in Table 10.

EXAMPLE 35

The procedure of Example 32 was repeated for the film of Example 3. The average particle diameter of the residual neutralizing agent contained in the obtained film was 800 nm. Other physical properties and characteristic properties of the film are shown in Table 10.

EXAMPLE 36

The procedure of Example 32 was repeated for the film of Example 5. The average particle diameter of the residual neutralizing agent contained in the obtained film was 300 nm. Other physical properties and characteristic properties of the film are shown in Table 10.

EXAMPLE 37

An aromatic polyamide film was obtained in the same manner as in Example 33 except that a dried unoriented film was stretched to 2.0 times in a longitudinal direction and to 3.5 times in a transverse direction. The physical properties and characteristic properties of the film are shown in Table 10.

EXAMPLE 38

An aromatic polyamide film was obtained in the same manner as in Example 33 except that a dried unoriented film was stretched to 2.8 times in a longitudinal direction and to 2.8 times in a transverse direction. The physical properties and characteristic properties of the film are shown in Table 10.

EXAMPLE 39

An aromatic polyamide film was obtained in the same manner as in Example 33 except that calcium carbonate was used as a neutralizing agent. The physical properties and characteristic properties of the film are shown in Table 10.

EXAMPLE 40

An aromatic polyamide film was obtained in the same manner as in Example 33 except that magnesium hydroxide was used as a neutralizing agent. The physical properties and characteristic properties of the film are shown in Table 10.

EXAMPLE 41

An aromatic polyamide film was obtained in the same manner as in Example 33 except that the molar ratio of paraphenylenediamine to 3,4'-diaminodiphenyl ether as amine components was changed to 37.5/12.5 (total of 50 mol %). The physical properties and characteristic properties of the film are shown in Table 10.

EXAMPLE 42

An aromatic polyamide film was obtained in the same manner as in Example 33 except that the molar ratio of paraphenylenediamine to 3.4'-diaminodiphenyl ether as amine components was changed to 12.5/37.5 (total of 50 mol %). The physical properties and characteristic properties of the film are shown in Table 10.

EXAMPLES 43 AND 44

Aromatic polyamide films were obtained in the same manner as in Example 33 except that the coating solutions [XV] and [XVI] for coating layers were used in Examples 43 and 44, respectively. The physical properties and characteristic properties of the film are shown in Table 10.

EXAMPLE 45

An aromatic polyamide film was obtained in the same manner as in Example 33 except that the coating solution

[VIII] for a coating layer was used in an amount of 2.0 g/m². The physical properties and characteristic properties of the film are shown in Table 10.

EXAMPLES 46 TO 49

Aromatic polyamide films were obtained in the same manner as in Example 33 except that the coating solutions [IX] to [XII] for coating layers were used in Examples 46 to 49, respectively. The physical properties and characteristic properties of the film are shown in Table 10.

COMPARATIVE EXAMPLE 17

An aromatic polyamide film was obtained in the same manner as in Example 32 except that a dried unoriented film was not stretched. The physical properties and characteristic properties of the film are shown in Table 11. This unoriented film had few protrusions derived from particles contained in the film on the surface, was inferior in slipperiness and winding property and had low Young's moduli. Therefore, the film was inferior in electromagnetic conversion characteristics.

COMPARATIVE EXAMPLE 18

An aromatic polyamide film was obtained in the same manner as in Example 32 except that an NMP slurry of calcium hydroxide was added to a polymerization system to adjust pH to 3.8 so as to prepare a stock solution for film formation. Particles regarded as the residual neutralizing agent were not found in the obtained film. Other physical properties and characteristic properties of the film are shown in Table 11. This film having no protrusions derived from the particles contained in the film on the surface was inferior in slipperiness and winding property.

COMPARATIVE EXAMPLE 19

An aromatic polyamide film was obtained in the same manner as in Example 32 except that an NMP slurry of a neutralizing agent was not added to a polymerization system to prepare a stock solution for film formation (pH: 2.3). Particles regarded as the residual neutralizing agent were not found in the obtained film. Other physical properties and characteristic properties of the film are shown in Table 11. This film having no protrusions on the surface was inferior in slipperiness and winding property.

COMPARATIVE EXAMPLE 20

An aromatic polyamide film was obtained in the same manner as in Example 32 except that an NMP slurry of calcium hydroxide was added to a polymerization system to adjust pH to 3.8 and a pre-dispersed silica having an average particle diameter of 10 nm was further added to prepare a stock solution for film formation. Particles regarded as the residual neutralizing agent were not found in the obtained film. Other physical properties and characteristic properties of the film are shown in Table 11. Since the externally added particles had insufficient affinity for the polymer and agglomerated, the obtained film was inferior in abrasion resistance. Further, since the appropriate smoothness of the surface was lost by large protrusions derived from the agglomerates of the particles, the film was inferior in electromagnetic conversion characteristics.

COMPARATIVE EXAMPLE 21

An aromatic polyamide film was obtained in the same manner as in Example 32 except that an NMP slurry of calcium hydroxide was added to a polymerization system to adjust pH to 3.8 and a pre-dispersed silica having an average particle diameter of 430 nm was further added to prepare a stock solution for film formation. Particles regarded as the residual neutralizing agent were not found in the obtained film. Other physical properties and characteristic properties of the film are shown in Table 11. Since the externally added particles had insufficient affinity for the polymer and agglomerated, the obtained film was inferior in abrasion resistance. Further, since the appropriate smoothness of the surface was lost by large protrusions derived from the agglomerates of the particles, the film was inferior in electromagnetic conversion characteristics.

COMPARATIVE EXAMPLES 22 TO 24

Aromatic polyamide films were obtained in the same manner as in Example 33 except that the coating solutions [XVII] and [XIX] were used in Comparative Examples 22 to 24, respectively. The physical properties and characteristic properties of these films are shown in Table 11.

COMPARATIVE EXAMPLES 25 TO 26

Aromatic polyamide films were obtained in the same manner as in Example 33 except that the coating solutions [XIII] and [XIV] were used in Comparative Examples 25 and 26, respectively. The physical properties and characteristic properties of these films are shown in Table 11.

TABLE 10

| | proportion of 3,4'-DAPE* | particles of neutralizing agent** | stretch ratio | coating solution | amount of coating before drying | thickness of coating layer after drying (t) | t/d | agglomeration of particles in coating film |
|---|---|---|---|---|---|---|---|---|
| Ex. 32 | 25 mol % | Ca(OH)$_2$ 150 nm$^\phi$ → 300 nm$^\phi$ | 2.5 × 3.0 | [VII] (1%) | 1.0 g/m² | 10 nm | 0.5 | ○ |
| Ex. 33 | 25 mol % | Ca(OH)$_2$ 6000 nm$^\phi$ → 500 nm$^\phi$   Ca(OH)$_2$ 700 nm$^\phi$ → 180 nm$^\phi$ | 2.5 × 3.0 | [VII] (1%) | 1.0 g/m² | 10 nm | 0.5 | ○ |
| Ex. 34 | 25 mol % | Ca(OH)$_2$ 600 nm$^\phi$ → 120 nm$^\phi$ | 2.5 × 3.0 | [VII] (1%) | 1.0 g/m² | 10 nm | 0.5 | ○ |
| Ex. 35 | 25 mol % | Ca(OH)$_2$ 2200 nm$^\phi$ → 800 nm$^\phi$ | 2.5 × 3.0 | [VII] (1%) | 1.0 g/m² | 10 nm | 0.5 | ○ |
| Ex. 36 | 25 mol % | Ca(OH)$_2$ 600 nm$^\phi$ → 300 nm$^\phi$ | 2.5 × 3.0 | [VII] (1%) | 1.0 g/m² | 10 nm | 0.5 | ○ |
| Ex. 37 | 25 mol % | Ca(OH)$_2$ 6000 nm$^\phi$ → 500 nm$^\phi$   Ca(OH)$_2$ 700 nm → 180 nm$^\phi$ | 2.0 × 3.5 | [VII] (1%) | 1.0 g/m² | 10 nm | 0.5 | ○ |

TABLE 10-continued

| | | | | | | | | | |
|---|---|---|---|---|---|---|---|---|---|
| Ex. 38 | 26 mol % | Ca(OH)$_2$ 6000 nm[74] → 500 nm$^\phi$ | Ca(OH)$_2$ 700 nm$^\phi$ → 180 nm$^\phi$ | 2.8 × 2.8 | [VII] (1%) | 1.0 g/m$^2$ | 10 nm | 0.5 | ◯ |
| Ex. 39 | 25 mol % | CaCO$_3$ 6000 nm$^\phi$ → 500 nm$^\phi$ | CaCO$_3$ 700 nm$^\phi$ → 180 nm$^\phi$ | 2.5 × 3.0 | [VII] (1%) | 1.0 g/m$^2$ | 10 nm | 0.5 | ◯ |
| Ex. 40 | 25 mol % | Mg(OH)$_2$ 6000 nm$^\phi$ → 500 nm$^\phi$ | Mg(OH)$_2$ 700 nm$^\phi$ → 180 nm$^\phi$ | 2.5 × 3.0 | [VII] (1%) | 1.0 g/m$^2$ | 10 nm | 0.5 | ◯ |
| Ex. 41 | 12.5 mol % | Ca(OH)$_2$ 6000 nm$^\phi$ → 500 nm$^\phi$ | Ca(OH)$_2$ 700 nm$^\phi$ → 180 nm$^\phi$ | 2.5 × 3.0 | [VII] (1%) | 1.0 g/m$^2$ | 10 nm | 0.5 | ◯ |

| | density of protrusions | void rate | Young's modulus (longitudinal and transverse directions) | WRa/WRz | winding property | abrasion resistance | blocking under high-pressure, wet and heat conditions | S/N | adhesion of MAG layer |
|---|---|---|---|---|---|---|---|---|---|
| Ex. 32 | 2.7 × 10$^3$ per/mm$^2$ | 1.05 | 2500 kg/mm$^2$ | 5 nm/70 nm | ⊙ | ⊙ | ◯ | ⊙ | ◯ |
| Ex. 33 | 8.5 × 10$^1$ per mm$^2$ | 1.8 × 10$^4$ per mm$^2$ | 1.01 | 2500 kg/mm$^2$ 4 nm/90 nm | ⊙ | ⊙ | ◯ | ⊙ | ◯ |
| Ex. 34 | 2.0 × 10$^4$ per/mm$^2$ | 1.02 | 2500 kg/mm$^2$ | 3 nm/40 nm | ⊙ | ⊙ | ◯ | ⊙ | ◯ |
| Ex. 35 | 2.7 × 10$^3$ per/mm$^2$ | 1.03 | 2500 kg/mm$^2$ | 8 nm/160 nm | ⊙ | ⊙ | ◯ | ◯ | ◯ |
| Ex. 36 | 7.0 × 10$^4$ per/mm$^2$ | 1.03 | 2500 kg/mm$^2$ | 8 nm/80 nm | ⊙ | ⊙ | ◯ | ◯ | ◯ |
| Ex. 37 | 9.1 × 10$^1$ per mm$^2$ | 1.9 × 10$^4$ per mm$^2$ | 1.04 | 2350 kg/mm$^2$ 4 nm/85 nm | ⊙ | ⊙ | ◯ | ⊙ | ◯ |
| Ex. 38 | 8.1 × 10$^1$ per mm$^2$ | 1.7 × 10$^4$ per mm | 1.05 | 2600 kg/mm$^2$ 4 nm/95 nm | ⊙ | ⊙ | ◯ | ⊙ | ◯ |
| Ex. 39 | 6.9 × 10$^1$ per mm$^2$ | 1.5 × 10$^4$ per mm$^2$ | 1.03 | 2500 kg/mm$^2$ 3 mn/90 nm | ⊙ | ⊙ | ◯ | ⊙ | ◯ |
| Ex. 40 | 3.2 × 10$^1$ per mm$^2$ | 6.7 × 10$^3$ per mm$^2$ | 1.03 | 2500 kg/mm$^2$ 2 nm/85 nm | ⊙ | ⊙ | ◯ | ⊙ | ◯ |
| Ex. 41 | 9.4 × 10$^1$ per mm$^2$ | 2.0 × 10$^3$ per mm$^2$ | 1.02 | 2800 kg/mm$^2$ 5 nm/95 nm | ⊙ | ⊙ | ◯ | ⊙ | ◯ |

| | proportion of 3,4'-DAPE* | particles of neutralizing agent** | stretch ratio | coating solution | amount of coating before drying | thickness of coating layer after drying (t) | t/d | agglomeration of particles in coating film |
|---|---|---|---|---|---|---|---|---|
| Ex. 42 | 37.5 mol % | Ca(OH)$_2$ 6000 nm → 500 nm$^\phi$ | Ca(OH)$_2$ 700 nm$^\phi$ → 180 nm$^\phi$ | 2.5 × 3.0 | [VII] (1%) | 1.0 g/m$^2$ | 10 nm | 0.5 | ◯ |
| Ex. 43 | 25 mol % | Ca(OH)$_2$ 6000 nm$^\phi$ → 500 nm$^\phi$ | Ca(OH)$_2$ 700 nm$^\phi$ → 180 nm$^\phi$ | 2.5 × 3.0 | [XVII] (1%) | 1.0 g/m$^2$ | 10 nm | 0.5 | ◯ |
| Ex. 44 | 25 mol % | Ca(OH)$_2$ 6000 nm$^\phi$ → 500 nm$^\phi$ | Ca(OH)$_2$ 700 nm$^\phi$ → 180 nm$^\phi$ | 2.5 × 3.0 | [XVIII] (1%) | 1.0 g/m$^2$ | 10 nm | 0.5 | ◯ |
| Ex. 45 | 25 mol % | Ca(OH)$_2$ 6000 nm → 500 nm$^\phi$ | Ca(OH)$_2$ 700 nm$^\phi$ → 180 nm$^\phi$ | 2.5 × 3.0 | [VIII] (1%) | 2.0 g/m$^2$ | 30 nm | 1.5 | ◯ |
| Ex. 46 | 25 mol % | Ca(OH)$_{2\ 2}$ 6000 nm$^\phi$ → 500 nm$^\phi$ | Ca(OH)$_2$ 700 nm$^\phi$ → 180 nm$^\phi$ | 2.5 × 3.0 | [IX] (1%) | 1.0 g/m$^2$ | 10 nm | 0.25 | ◯ |
| Ex. 47 | 25 mol % | Ca(OH)$_2$ 6000 nm$^\phi$ → 500 nm$^\phi$ | Ca(OH)$_2$ 700 nm$^\phi$ → 180 nm$^\phi$ | 2.5 × 3.0 | [X] (1%) | 1.0 g/m$^2$ | 10 nm | 0.4 | ◯ |
| Ex. 48 | 25 mol % | Ca(OH)$_2$ 6000 nm$^\phi$ → 500 nm$^\phi$ | Ca(OH)$_2$ 700 nm$^\phi$ → 180 nm$^\phi$ | 2.5 × 3.0 | [XI] (1%) | 1.0 g/m$^2$ | 10 nm | 0.6 | Δ |
| Ex. 49 | 25 mol % | Ca(OH)$_2$ 6000 nm$^\phi$ → 500 nm$^\phi$ | Ca(OH)$_2$ 700 nm$^\phi$ → 180 nm$^\phi$ | 2.5 × 3.0 | [XII] (1%) | 1.0 g/m$^2$ | 10 nm | 0.5 | Δ |

TABLE 10-continued

| | density of protrusions | void rate | Young's modulus (longitudinal and transverse directions) | WRa/WRz | winding property | abrasion resistance | blocking under high-pressure, wet and heat conditions | S/N | adhesion of MAG layer |
|---|---|---|---|---|---|---|---|---|---|
| Ex. 42 | 7.9 × 10¹ per mm² | 1.7 × 10⁴ per mm² | 1.03 | 2300 kg/mm² | 4 nm/85 nm | ◉ | ◉ | ○ | ◉ | ○ |
| Ex. 43 | 8.5 × 10¹ per mm² | 1.8 × 10⁴ per mm² | 1.01 | 2500 kg/mm² | 4 nm/90 nm | ◉ | ◉ | ○ | ◉ | ○ |
| Ex. 44 | 8.5 × 10¹ per mm² | 1.8 × 10⁴ per mm² | 1.01 | 2500 kg/mm² | 4 nm/90 nm | ◉ | ◉ | ○ | ◉ | ○ |
| Ex. 45 | 8.5 × 10¹ per mm² | 1.8 × 10⁴ per mm² | 1.01 | 2500 kg/mm² | 4 nm/90 nm | ◉ | ◉ | Δ | ◉ | ○ |
| Ex. 46 | 8.5 × 10¹ per mm² | 1.8 × 10⁴ per mm² | 1.01 | 2500 kg/mm² | 4 nm/90 nm | ◉ | ○ | ○ | ◉ | ○ |
| Ex. 47 | 8.5 × 10¹ per mm² | 1.8 × 10⁴ per mm² | 1.01 | 2500 kg/mm² | 4 nm/90 nm | ◉ | ◉ | ○ | ◉ | ○ |
| Ex. 48 | 8.5 × 10¹ per mm² | 1.8 × 10⁴ per mm² | 1.01 | 2500 kg/mm² | 4 nm/90 nm | ◉ | ○ | Δ | ◉ | ○ |
| Ex. 49 | 8.5 × 10¹ per mm² | 1.8 × 10⁴ per mm² | 1.01 | 2500 kg/mm² | 4 nm/95 nm | ◉ | ○ | ○ | ○ | ○ |

TABLE 11

| | proportion of 3,4'-DAPE* | particles of neutralizing agent** | stretch ratio | coating solution | amount of coating before drying | thickness of coating layer after drying (t) | t/d | agglomeration of particles in coating film |
|---|---|---|---|---|---|---|---|---|
| C. Ex. 17 | 25 mol % | Ca(OH)₂ 1500 nmᵠ → 300 nmᵠ | 1.0 × 1.0 | [VII] (1%) | 1.0 g/m² | 10 nm | 0.5 | ○ |
| C. Ex. 18 | 25 mol % | Ca(OH)₂ 1500 nmᵠ → lost | 2.5 × 3.0 | [VII] (1%) | 1.0 g/m² | 10 nm | 0.5 | ○ |
| C. Ex. 19 | 25 mol % | — (not neutralized) | 2.5 × 3.0 | [VII] (1%) | 1.0 g/m² | 10 nm | 0.5 | ○ |
| C. Ex. 20 | 25 mol % | SiO₂ (externally added)*** 10 nmᵠ | 2.5 × 3.0 | [VII] (1%) | 1.0 g/m² | 10 nm | 0.5 | ○ |
| C. Ex. 21 | 25 mol % | SiO₂ (externally added)*** 430 nmᵠ | 2.5 × 3.0 | [VII] (1%) | 1.0 g/m² | 10 nm | 0.5 | ○ |
| C. Ex. 22 | 25 mol % | Ca(OH)₂ 6000 nmᵠ → 500 nmᵠ  Ca(OH)₂)₂ 700 nmᵠ → 180 nmᵠ | 2.5 × 3.0 | [XVII] (1%) | 1.0 g/m² | 10 nm | 0.5 | ○ |

| | density of protrusions | void rate | Young's modulus (longitudinal and transverse directions) | WRa/WRz | winding property | abrasion resistance | blocking under high-pressure, wet and heat conditions | S/N | adhesion of MAG layer |
|---|---|---|---|---|---|---|---|---|---|
| C. Ex. 17 | not identified | 1.0 | 1200 kg/mm² | 2 nm/9 nm | X | ○ | ○ | X | ○ |
| C. Ex. 18 | none | — | 2500 kg/mm² | 1 nm/6 nm | XX | ◉ | X | ◉ | ○ |
| C. Ex. 19 | none | — | 2500 kg/mm² | 1 nm/6 nm | XX | ◉ | X | ◉ | ○ |
| C. Ex. 20 | 6.7 × 10⁴**** per mm² | ***** 5.0 | 2500 kg/mm² | 6 nm/20 nm | X | X | ○ | X | ○ |
| C. Ex. 21 | 1.6 × 10³**** per mm² | 3.2 | 2500 kg/mm² | 15 nm/200 nm | ◉ | X | ○ | X | ○ |
| C. Ex. 22 | 8.5 × 10¹ per mm² | 1.8 × 10⁴ per mm² | 1.01 | 2500 kg/mm² | 4 nm/90 nm | ◉ | ◉ | X | ◉ | ○ |

TABLE 11-continued

| | proportion of 3,4'-DAPE* | particles of neutralizing agent** | | stretch ratio | coating solution | amount of coating before drying | thickness of coating layer after drying (t) | t/d | agglomeration of particles in coating film |
|---|---|---|---|---|---|---|---|---|---|
| C. Ex. 23 | 25 mol % | Ca(OH)$_2$ 6000 nm$^\phi$ → 500 nm$^\phi$ | Ca(OH)$_2$ 700 nm$^\phi$ → 180 nm$^\phi$ | 2.5 × 3.0 | [XVIII] (1%) | 1.0 g/m$^2$ | 10 nm | 0.5 | ○ |
| C. Ex. 24 | 25 mol % | Ca(OH)$_2$ 6000 nm$^\phi$ → 500 nm$^\phi$ | Ca(OH)$_2$ 700 nm$^\phi$ → 180 nm$^\phi$ | 2.5 × 3.0 | [XIX] (1%) | 1.0 g/m$^2$ | 10 nm | 0.5 | ○ |
| C. Ex. 25 | 25 mol % | Ca(OH)$_2$ 6000 nm$^\phi$ → 500 nm$^\phi$ | Ca(OH)$_2$ 700 nm$^\phi$ → 180 nm$^\phi$ | 2.5 × 3.0 | [XIII] (1%) | 1.0 g/m$^2$ | 10 nm | 0.5 | X |
| C. Ex. 26 | 25 mol % | Ca(OH)$_2$ 6000 nm$^\phi$ → 500 nm$^\phi$ | Ca(OH)$_2$ 700 nm$^\phi$ → 180 nm$^\phi$ | 2.5 × 3.0 | [XIV] (1%) | 1.0 g/m$^2$ | 10 nm | 0.5 | ○ |

| | density of protrusions | void rate | Young's modulus (longitudinal and transverse directions) | WRa/WRz | winding property | abrasion resistance | blocking under high-pressure, wet and heat conditions | S/N | adhesion of MAG layer |
|---|---|---|---|---|---|---|---|---|---|
| C. Ex. 23 | 8.5 × 10$^1$ per mm$^2$ | 1.8 × 10$^4$ per mm$^2$ | 1.01 | 2500 kg/mm$^2$ | 4 nm/90 nm | ◎ | ◎ | X | ◎ | ○ |
| C. Ex. 24 | 8.5 × 10$^1$ per mm$^2$ | 1.8 × 10$^4$ per mm$^2$ | 1.01 | 2500 kg/mm$^2$ | 4 nm/90 nm | ◎ | ◎ | X | ◎ | ○ |
| C. Ex. 25 | 8.5 × 10$^1$ per mm$^2$ | 1.8 × 10$^4$ per mm$^2$ | 1.01 | 2500 kg/mm$^2$ | 4 nm/90 nm | X | X | X | ○ | ○ |
| C. Ex. 26 | 8.5 × 10$^1$ per mm$^2$ | 1.8 × 10$^4$ per mm$^2$ | 1.01 | 2500 kg/mm$^2$ | 4 nm/90 nm | ◎ | X | ○ | X | ○ |

C. Ex.: Comparative Example
*: 3,4'-diaminodiphenyl ether
**: kind of particles, particle size before addition and particle size of particles contained in film
***: added externally
****: Protrusions which are considered to be formed by agglomerates are counted.
*****: Since the agglomeration of particles is marked, the void is calculated from the ratio of the long diameter of the whole agglomerate to the long diameter of a void.

In Examples 32 to 49 and Comparative Examples 17 to 26, the following physical properties were measured and defined by the following methods, provided that (17), (18), (19), (20) and (22) are the same as described above.

(24) agglomeration of colloidal particles

20 Photos of the coated surface of an adhesive aromatic polyamide film were taken at a magnification of 50,000× by a scanning electron microscope to count the number of agglomerates of 10 or more filler particles in the adhesive layer, and the number of agglomerates per 10 $\mu$m$^2$ was calculated. This was evaluated based on the following criteria.

| less than $^{10}/_{10}$ $\mu$m$^2$ | ○ |
|---|---|
| 10 to $^{30}/_{10}$ $\mu$m$^2$ | Δ |
| more than $^{30}/_{10}$ $\mu$m$^2$ | X |

(25) abrasion resistance (calendering)

This was evaluated using a 5-stage mini-super calender (steel roll×steel roll). The film was caused to run 2,000 m at a speed of 50 m/min at a processing temperature of 80° C. and a linear pressure of 200 kg/cm. Abrasion resistance was judged from the adhesion of abrasion dust on the top roll of the calender based on the following criteria.

| no abrasion dust on top roll | ◎ |
|---|---|
| small amount of abrasion dust on top roll | ○ |
| large amount of abrasion dust on top roll | X |

(26) blocking under high-pressure, wet and heat conditions

Two films were superposed together in such a manner that a treated side of one film and an untreated side of the other film were in contact with each other, and applied with a pressure of 150 kg/cm$^2$ under an environment of 60° C. and 80 %RH for 65 hours. These films were peeled from each other and blocking under high-pressure, wet and heat conditions was evaluated from its peeling (g/5 cm in width). Evaluation was made from peeling based on the following criteria.

| less than 10 g/5 cm | ○ |
|---|---|
| 10 to 15 g/5 cm | Δ |
| more than 15 g/5 cm → rupture | X |

What is claimed is:

1. A biaxially oriented film made from a wholly aromatic polyamide produced by an acid chloride process, which contains at least one member of inorganic particles having an average particle diameter of 5 to 2,000 nm and selected from the group consisting of hydroxides, carbonates and bicarbonates of metals of groups Ia and IIa of the periodic table, the inorganic particles being derived from inorganic particles which are added as a neutralizing agent to a reaction system to neutralize hydrogen chloride by-produced by the acid chloride reaction and its content corresponding to an excess portion added to the reaction system over the amount required for neutralizing the hydrogen chloride stoichiometrically.

2. The biaxially oriented film of claim 1, wherein the wholly aromatic polyamide consists of at least one member of recurring units selected from the group consisting of recurring units represented by the following formulas (1) to (4) (provided that the wholly aromatic polyamide always contains (at least one of recurring units of the formulas (1) and (2)):

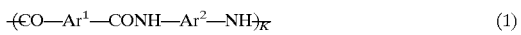  (1)

wherein $Ar^1$ and $Ar^2$ are independently selected from the group consisting of

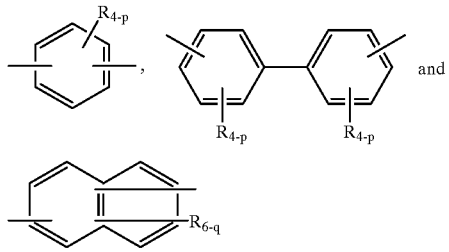

(in which p is an integer of 0 to 4, q is an integer of 0 to 6, R is selected from the group consisting of halogen, nitro group, cyano group, alkyl group having 1 to 4 carbon atoms, alkoxyl group having 1 to 3 carbon atoms and trialkylsilyl group) and k is 0 or a positive number),

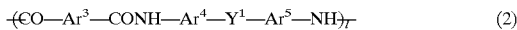  (2)

wherein $Ar^3$, $Ar^4$ and $Ar^5$ are independently selected from the same groups as those of $Ar^1$ and $Ar^2$, $Y^1$ is selected from the group consisting of —O—, —CH$_2$—, —C(CH$_3$)$_2$—, —SO$_2$—, —S— and —CO—, and l is 0 or a positive number,

  (3)

wherein $Ar^6$ is selected from the same groups as those of $Ar^1$ and $Ar^2$, and m is 0 or a positive number, and

  (4)

wherein $Ar^7$ and $Ar^8$ are independently selected from the same groups as those of $Ar^1$ and $Ar^2$, $Y^2$ is selected from the same groups as those of $Y^1$, and n is 0 or a positive number.

3. The biaxially oriented film of claim 2 which consists of at least one member of recurring units selected from the group consisting of recurring units represented by the above formulas (1) to (4), 50 to 99.5% of at least one member of aromatic groups selected from the group consisting of $Ar^1$ to $Ar^8$ having a para-orientation and forming a main chain.

4. The biaxially oriented film of claim 2, wherein the wholly aromatic polyamide consists of recurring units represented by the above formula (1) and recurring units represented by the above formula (2).

5. The biaxially oriented film of claim 4, wherein $Ar^1$ and $Ar^2$ are both a 1,4-phenylene group in the above formula (1) and $Ar^3$ is a 1,4-phenylene group and —$Ar^4$—$Y^1$—$Ar^5$— is

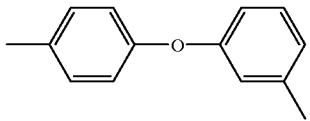

in the above formula (2).

6. The biaxially oriented film of claim 1, wherein the inorganic particles having an average particle diameter of 5 to 2,000 nm are contained in an amount of 0.001 to 10 parts by weight based on 100 parts by weight of the wholly aromatic polyamide.

7. The biaxially oriented film of claim 1 which has protrusions derived from the inorganic particles having an average particle diameter of 5 to 2,000 nm, at a density of $1\times10^1$ to $1\times10^8$/mm$^2$ on the surface.

8. The biaxially oriented film of claim 1, wherein the wholly aromatic polyamide has a logarithmic viscosity, measured at 30° C. in concentrated sulfuric acid, of at least 0.5 dl/g.

9. The biaxially oriented film of claim 1, wherein the sum of Young's moduli in two directions intersecting at right angles on the film plane is at least 2,000 kg/mm$^2$.

10. The biaxially oriented film of claim 1, wherein the Young's modulus in at least one direction of the two directions intersecting at right angles is at least 600 kg/mm$^2$.

11. The biaxially oriented film of claim 1, wherein the inorganic particles have an average particle diameter of 80 to 1,000 nm, protrusions derived from the inorganic particles are existent on the surface of the film at a density of $1\times10^1$ to $1\times10^5$/mm$^2$, and the sum of Young's moduli in two directions intersecting at right angles on the film plane is at least 2,000 kg/mm$^2$.

12. The biaxially oriented film of claim 11, wherein the flexural rigidity in one direction of the film plane is 3.0 to 9.5 mg·mm.

13. The biaxially oriented film of claim 11 which has a tensile strength at break in a longitudinal direction of the film of at least 38 kg/mm$^2$.

14. The biaxially oriented film of claim 11 which has a thermal shrinkage in one direction of the film of less than 1%.

15. The biaxially oriented film of claim 1, wherein the inorganic particles have an average particle diameter of 5 to 150 nm, protrusions derived from the inorganic particles are existent on the surface of the film at a density of $5\times10^3$ to $1\times10^8$/mm$^2$, and the sum of Young's moduli in two directions intersecting at right angles on the film plane is at least 2,000 kg/mm$^2$.

16. The biaxially oriented film of claim 15, wherein elemental halogen ions are not detected from the surface of the film by photoelectric spectrophotometry.

17. The biaxially oriented film of claim 1 which has a thickness of 0.1 to 20 μm.

18. A base film for a magnetic recording medium, which has a coating layer on at least one surface side of the biaxially oriented film of claim 11, the coating layer comprising a water-dispersible copolyester resin as a binder component which comprises 40 to 99 mol % of 2,6-naphthalenedicarboxylic acid, 0.1 to 5 mol % of an aromatic dicarboxylic acid having a sulfonate salt group, 0 to 55 mol % of other aromatic dicarboxylic acid as the aromatic dicarboxylic acid components and 40 to 100 mol % ethylene glycol, 0 to 60 mol % of an addition product of a bisphenol A with a lower alkylene oxide and 0 to 10 mol % of other glycol as glycol components, the surface side not in contact with the biaxially oriented film, of the coating layer having a surface roughness WRa of 0.5 to 10 nm and a WRz of 5 to 200 nm.

19. The base film for a magnetic recording medium of claim 18, wherein the coating layer contains fine particles having an average particle diameter of 10 to 50 nm in an amount of 1 to 50 wt % based on the above binder component and satisfies the following equation:

$$0.2 \leq t/d \leq 2.0$$

wherein t is a thickness of the coating layer (nm) and d is an average particle diameter of the fine particles (nm).

20. The biaxially oriented film of claim 15 which is a base film for a magnetic recording medium.

21. A coated high-density magnetic recording medium which comprises the biaxially oriented film of claim 11 and a magnetic coating layer formed on one surface side of the biaxially oriented film.

22. A coated high-density magnetic recording medium which comprises the base film for a magnetic recording medium of claim 18 and a magnetic coating layer formed on the coating layer of the base film.

23. A thin metal film high-density magnetic recording medium which comprises the biaxially oriented film of claim 15 and a deposited metal thin film formed on one surface side of the film.

24. A multi-layer coated high-density recording medium which comprises the biaxially oriented film of claim 15 and magnetic coating layers formed on one surface side of the film, the magnetic coating layers consisting of a non-magnetic buffer coating layer formed directly on the biaxially oriented film and a magnetic coating layer formed on the buffer layer.

* * * * *